US011757767B2

(12) United States Patent
Dutta

(10) Patent No.: US 11,757,767 B2
(45) Date of Patent: Sep. 12, 2023

(54) SOURCE ROUTING WITH SHADOW ADDRESSES

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/380,851

(22) Filed: Jul. 20, 2021

(65) Prior Publication Data

US 2023/0022876 A1    Jan. 26, 2023

(51) Int. Cl.
 *H04L 45/00* (2022.01)
 *H04L 45/741* (2022.01)
 *H04L 45/7453* (2022.01)

(52) U.S. Cl.
 CPC .............. *H04L 45/34* (2013.01); *H04L 45/20* (2013.01); *H04L 45/741* (2013.01); *H04L 45/7453* (2013.01)

(58) Field of Classification Search
 CPC ....... H04L 45/34; H04L 45/20; H04L 45/741; H04L 45/7453
 See application file for complete search history.

(56) References Cited

U.S. PATENT DOCUMENTS

| | | | |
|---|---|---|---|
| 2020/0084300 A1* | 3/2020 | Dutta | ............... H04L 69/22 |
| 2020/0119991 A1* | 4/2020 | Dutta | ............... H04L 65/70 |
| 2020/0287824 A1 | 9/2020 | Dutta | |
| 2021/0092048 A1 | 3/2021 | Dutta | |
| 2021/0306257 A1 | 9/2021 | Dutta | |

FOREIGN PATENT DOCUMENTS

| | | |
|---|---|---|
| EP | 1 060 598 A1 | 12/2000 |
| EP | 1 195 954 A2 | 4/2002 |

OTHER PUBLICATIONS

Filsfils, C., et al., "Segment Routing Architecture," IETF, RFC 8402, Jul. 2018, 32 pages.

(Continued)

*Primary Examiner* — Jung H Park
(74) *Attorney, Agent, or Firm* — Tong, Rea, Bentley & Kim, LLC

(57) ABSTRACT

Various example embodiments for supporting source routing are presented herein. Various example embodiments for supporting source routing may be configured to support source route compression for source routing. Various example for supporting source route compression for source routing may be configured to support source route compression for source routing based on use of shadow addresses. Various example for supporting source route compression for source routing based on use of shadow addresses may be configured to support source routing of packets based on use of shadow addresses of hops in place of actual addresses of hops to encode source routes within source routed packets, thereby compressing the source routes within the source routed packets and, thus, providing source route compression.

16 Claims, 15 Drawing Sheets

(56) References Cited

OTHER PUBLICATIONS

Filsfils, C., et al., "Segment Routing Policy Architecture," IETF, IETF Draft, draft-ietf-spring-segment-routing-policy-09, Nov. 1, 2020, 37 pages.
Bashandy, A., et al., "Segment Routing with the MPLS Data Plane," IETF, RFC 8660, Dec. 2019, 29 pages.
Filsfils, C., et al., "IPv6 Segment Routing Header (SRH)," IETF, RFC 8754, Mar. 2020, 27 pages.
Awduche, D., et al., "RSVP-TE: Extensions to RSVP for LSP Tunnels," IETF, RFC 3209, Dec. 2001, 61 pages.
IETF, "Internet Protocol—DARPA Internet Program—Protocol Specification," IETF, RFC 791, Sep. 1981, 51 pages.
Deering, S., "Internet Protocol, Version 6 (IPv6) Specification," IETF, RFC 2460, Dec. 1998, 39 pages.
Katz, D., et al., "IP Router Alert Option," IETF, RFC 2113, Feb. 1997, 4 pages.
Partridge, C., et al., "IPv6 Router Alert Option," IETF, RFC 2711, Oct. 1999, 6 pages.
EP Extended Search Report mailed in corresponding EP Application No. 22183927.7 dated Nov. 4, 2022, 8 pages.

* cited by examiner

FIG. 3

SPECIAL ADDRESS
BLOCKS
300

| SPECIAL ADDRESS BLOCKS | | | | |
|---|---|---|---|---|
| ADDRESS BLOCK | ADDRESS RANGE | NUMBER OF ADDRESSES | SCOPE | DESCRIPTION |
| 172.16.0.0/12 | 172.16.0.0–172.31.255.255 | 1048576 | PRIVATE NETWORK | USED FOR LOCAL COMMUNICATIONS WITHIN A PRIVATE NETWORK |
| 192.0.0.0/24 | 192.0.0.0–192.0.0.255 | 256 | PRIVATE NETWORK | IETF PROTOCOL ASSIGNMENTS |
| 192.168.0.0/16 | 192.168.0.0–192.168.255.255 | 65536 | PRIVATE NETWORK | USED FOR LOCAL COMMUNICATIONS WITHIN A PRIVATE NETWORK |
| 198.18.0.0/15 | 198.18.0.0–198.19.255.255 | 131072 | PRIVATE NETWORK | USED FOR BENCHMARK TESTING OF INTER-NETWORK COMMUNICATIONS BETWEEN TWO SEPARATE SUBNETS |

SHADOW ADDRESS TABLE 500

| Shadow Address Table (SAT) ||
|---|---|
| Shadow Address | Actual Address |
| Shadow_address_1 | Actual_address_1 |
| ...... | ...... |
| Shadow_address_N | Actual_address_N |

*FIG. 6*

SHADOW ADDRESS TABLE 600

| Shadow Address Table (SAT) ||
|---|---|
| Shadow Address (IPv4) | Actual Address (IPv6) |
| 10.10.10.1 | 2001:0db8:85a3:0000:0000:8a2e:0370:7334 |
| ...... | ...... |
| 172.2.5.6 | 4002:0db8:85a3:0000:0000:8a2e:9572:3742 |

*FIG. 7*

INVERSE SHADOW ADDRESS TABLE 700

| Inverse Shadow Address Table (I-SAT) ||
|---|---|
| Actual Address | Shadow Address |
| Actual_address_1 | Shadow_address_1 |
| ...... | ...... |
| Actual_address_N | Shadow_address_N |

HOP-BY-HOP
OPTIONS HEADER
1300

TLV- ENCODED
OPTION
1400

IPV4-MAPPED-IPV6-SSR OPTION 1500

PROTOCOL STACK 1600

*FIG. 17*

IP-SHIM
HEADER
1700

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |            Length             |  Next Header  |
+-+-+-+-+-+-+-+-+-+-+-+-+-+-+-+-+-+-+-+-+-+-+-+-+-+-+-+-+-+-+-+-+
|                  Payload(Type-specific format/data)            |
/                                                                /
/                                                                /
+-+-+-+-+-+-+-+-+-+-+-+-+-+-+-+-+-+-+-+-+-+-+-+-+-+-+-+-+-+-+-+-+
```

*FIG. 18*

IPV4-MAPPED-IPV6-
SSR OPTION
1800

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
|    Pointer    |
+-+-+-+-+-+-+-+-+-+-+-+-+-+-+-+-+-+-+-+-+-+-+-+-+-+-+-+-+-+-+-+-+
|                         IPv4 Address[1]                        |
+-+-+-+-+-+-+-+-+-+-+-+-+-+-+-+-+-+-+-+-+-+-+-+-+-+-+-+-+-+-+-+-+
~                                                                ~
+-+-+-+-+-+-+-+-+-+-+-+-+-+-+-+-+-+-+-+-+-+-+-+-+-+-+-+-+-+-+-+-+
|                         IPv4 Address[n]                        |
+-+-+-+-+-+-+-+-+-+-+-+-+-+-+-+-+-+-+-+-+-+-+-+-+-+-+-+-+-+-+-+-+
```

SOURCE ROUTING WITH SHADOW ADDRESSES

TECHNICAL FIELD

Various example embodiments relate generally to communications and, more particularly but not exclusively, to supporting communications based on source routing.

BACKGROUND

In communication networks, various communications technologies may be used to support various types of communications.

SUMMARY

In at least some example embodiments, an apparatus includes at least one processor and at least one memory including computer program code, wherein the at least one memory and the computer program code are configured to, with the at least one processor, cause the apparatus at least to support communication of a source routed packet from a first node to a second node using a path composed of a set of hops having a respective set of actual addresses associated therewith, wherein the source routed packet includes an encoding of the path, wherein the encoding of the path includes an encoding of a respective set of shadow addresses associated with the respective hops of the path, wherein the respective shadow addresses associated with the respective hops of the path are shorter than the respective actual addresses for the respective hops of the path. In at least some example embodiments, the set of hops of the path includes at least one of at least one strict hop and at least one loose hop. In at least some example embodiments, the respective actual addresses for the respective hops of the path include Internet Protocol (IP) addresses, Multiprotocol Label Switching (MPLS) labels, or Media Access Control (MAC) addresses. In at least some example embodiments, the respective shadow addresses associated with the respective hops of the path are based on hashing of the respective actual addresses for the respective hops of the path. In at least some example embodiments, the actual addresses for the respective hops of the path include Internet Protocol version 6 (IPv6) addresses and the shadow addresses associated with the respective hops of the path include Internet Protocol version 4 (IPv4) addresses. In at least some example embodiments, the encoding of the path includes an indication that the path is encoded within the source routed packet using the respective shadow addresses associated with the respective hops of the path rather than the respective actual addresses for the respective hops of the path. In at least some example embodiments, the encoding of the path is included within an Internet Protocol version 6 (IPv6) Extension Header (EH). In at least some example embodiments, the encoding of the path is included within a Hop-by-Hop Options Header. In at least some example embodiments, the Hop-by-Hop Options Header includes a Next Header field, a Header Extension Length field, and an Options field, wherein the Options field includes an Option Type field, an Option Data Length field, and an Option Data field, wherein the Option Data field includes an address list including the respective shadow addresses associated with the respective hops of the path. In at least some example embodiments, the encoding of the path is included within an Internet Protocol version 6 (IPv6) Shim Header disposed between an IPv6 Header and a transport layer protocol header. In at least some example embodiments, the IPv6 Shim Header includes a Type field, a Length field, a Next Header field, and a Payload field, wherein the Payload field includes a Pointer field and an Address list field. In at least some example embodiments, the Address list field includes an address list including the respective shadow addresses associated with the respective hops of the path, wherein the Pointer field includes a value indicative of a next address in the address list to be processed. In at least some example embodiments, to support communication of the source routed packet, the at least one memory and the computer program code are configured to, with the at least one processor, cause the apparatus at least to receive, by the first node, an indication of the actual addresses of the path, generate, by the first node based on the indication of the actual addresses of the path, the encoding of the path, associate, by the first node, the encoding of the path with a payload to form the source routed packet, and forward, by the first node, the source routed packet toward a first hop of the set of hops of the path. In at least some example embodiments, the encoding of the path is generated based on a set of mappings of the actual addresses of the path to the respective shadow addresses associated with the respective hops of the path. In at least some example embodiments, to support communication of the source routed packet, the at least one memory and the computer program code are configured to, with the at least one processor, cause the apparatus at least to receive, by a node, the source routed packet, identify, by the node, one of the hops of the path that is adjacent to the node, determine, by the node based on the respective shadow address of the one of the hops of the path that is adjacent to the node, the respective actual address of the one of the hops of the path that is adjacent to the node, and forward, by the node toward the one of the hops of the path based on the respective actual address of the one of the hops of the path, the source routed packet. In at least some example embodiments, the one of the hops of the path that is adjacent to the node is determined based on an offset value associated with the encoding of the path. In at least some example embodiments, the respective actual address of the one of the hops of the path that is adjacent to the node is determined based on a set of mappings of the respective shadow addresses associated with the respective hops of the path to the actual addresses of the path. In at least some example embodiments, to support communication of the source routed packet, the at least one memory and the computer program code are configured to, with the at least one processor, cause the apparatus at least to receive, by the second node, the source routed packet, determine, by the second node based on the encoding of the path, that the second node is an egress node of the path, remove, by the second node from the source routed packet based on the second node being the egress node of the path, the encoding of the path from the source routed packet to form a packet, and forward, by the second node, the packet.

In at least some example embodiments, a computer readable medium stores computer program code configured to cause an apparatus at least to support communication of a source routed packet from a first node to a second node using a path composed of a set of hops having a respective set of actual addresses associated therewith, wherein the source routed packet includes an encoding of the path, wherein the encoding of the path includes an encoding of a respective set of shadow addresses associated with the respective hops of the path, wherein the respective shadow addresses associated with the respective hops of the path are shorter than the respective actual addresses for the respective hops of the path. In at least some example embodiments, the set of hops of the path includes at least one of at least one strict hop and at least one loose hop. In at least some example embodiments, the respective actual addresses for the respective hops of the path include Internet Protocol (IP) addresses, Multiprotocol Label Switching (MPLS) labels, or Media Access Control (MAC) addresses. In at least some example embodiments, the respective shadow addresses associated with the respective hops of the path are based on hashing of the respective actual addresses for the respective hops of the path. In at least some example embodiments, the actual addresses for the respective hops of the path include Internet Protocol version 6 (IPv6) addresses and the shadow addresses associated with the respective hops of the path include Internet Protocol version 4 (IPv4) addresses. In at least some example embodiments, the encoding of the path includes an indication that the path is encoded within the source routed packet using the respective shadow addresses associated with the respective hops of the path rather than the respective actual addresses for the respective hops of the path. In at least some example embodiments, the encoding of the path is included within an Internet Protocol version 6 (IPv6) Extension Header (EH). In at least some example embodiments, the encoding of the path is included within a Hop-by-Hop Options Header. In at least some example embodiments, the Hop-by-Hop Options Header includes a Next Header field, a Header Extension Length field, and an Options field, wherein the Options field includes an Option Type field, an Option Data Length field, and an Option Data field, wherein the Option Data field includes an address list including the respective shadow addresses associated with the respective hops of the path. In at least some example embodiments, the encoding of the path is included within an Internet Protocol version 6 (IPv6) Shim Header disposed between an IPv6 Header and a transport layer protocol header. In at least some example embodiments, the IPv6 Shim Header includes a Type field, a Length field, a Next Header field, and a Payload field, wherein the Payload field includes a Pointer field and an Address list field. In at least some example embodiments, the Address list field includes an address list including the respective shadow addresses associated with the respective hops of the path, wherein the Pointer field includes a value indicative of a next address in the address list to be processed. In at least some example embodiments, to support communication of the source routed packet, the computer program code is configured to cause the apparatus at least to receive, by the first node, an indication of the actual addresses of the path, generate, by the first node based on the indication of the actual addresses of the path, the encoding of the path, associate, by the first node, the encoding of the path with a payload to form the source routed packet, and forward, by the first node, the source routed packet toward a first hop of the set of hops of the path. In at least some example embodiments, the encoding of the path is generated based on a set of mappings of the actual addresses of the path to the respective shadow addresses associated with the respective hops of the path. In at least some example embodiments, to support communication of the source routed packet, the computer program code is configured to cause the apparatus at least to receive, by a node, the source routed packet, identify, by the node, one of the hops of the path that is adjacent to the node, determine, by the node based on the respective shadow address of the one of the hops of the path that is adjacent to the node, the respective actual address of the one of the hops of the path that is adjacent to the node, and forward, by the node toward the one of the hops of the path based on the respective actual address of the one of the hops of the path, the source routed packet. In at least some example embodiments, the one of the hops of the path that is adjacent to the node is determined based on an offset value associated with the encoding of the path. In at least some example embodiments, the respective actual address of the one of the hops of the path that is adjacent to the node is determined based on a set of mappings of the respective shadow addresses associated with the respective hops of the path to the actual addresses of the path. In at least some example embodiments, to support communication of the source routed packet, the computer program code is configured to cause the apparatus at least to receive, by the second node, the source routed packet, determine, by the second node based on the encoding of the path, that the second node is an egress node of the path, remove, by the second node from the source routed packet based on the second node being the egress node of the path, the encoding of the path from the source routed packet to form a packet, and forward, by the second node, the packet.

In at least some example embodiments, a method includes supporting communication of a source routed packet from a first node to a second node using a path composed of a set of hops having a respective set of actual addresses associated therewith, wherein the source routed packet includes an encoding of the path, wherein the encoding of the path includes an encoding of a respective set of shadow addresses associated with the respective hops of the path, wherein the respective shadow addresses associated with the respective hops of the path are shorter than the respective actual addresses for the respective hops of the path. In at least some example embodiments, the set of hops of the path includes at least one of at least one strict hop and at least one loose hop. In at least some example embodiments, the respective actual addresses for the respective hops of the path include Internet Protocol (IP) addresses, Multiprotocol Label Switching (MPLS) labels, or Media Access Control (MAC) addresses. In at least some example embodiments, the respective shadow addresses associated with the respective hops of the path are based on hashing of the respective actual addresses for the respective hops of the path. In at least some example embodiments, the actual addresses for the respective hops of the path include Internet Protocol version 6 (IPv6) addresses and the shadow addresses associated with the respective hops of the path include Internet Protocol version 4 (IPv4) addresses. In at least some example embodiments, the encoding of the path includes an indication that the path is encoded within the source routed packet using the respective shadow addresses associated with the respective hops of the path rather than the respective actual addresses for the respective hops of the path. In at least some example embodiments, the encoding of the path is included within an Internet Protocol version 6 (IPv6) Extension Header (EH). In at least some example embodiments, the encoding of the path is included within a Hop-by-Hop Options Header. In at least some example embodiments, the Hop-by-Hop Options Header includes a Next Header field, a Header Extension Length field, and an Options field, wherein the Options field includes an Option Type field, an Option Data Length field, and an Option Data field, wherein the Option Data field includes an address list including the respective shadow addresses associated with the respective hops of the path. In at least some example embodiments, the encoding of the path is included within an Internet Protocol version 6 (IPv6) Shim Header disposed between an IPv6 Header and a transport layer protocol header. In at least some example embodiments, the IPv6 Shim Header includes a Type field, a Length field, a Next Header field, and a Payload field, wherein the Payload field includes a Pointer field and an Address list field. In at least some example embodiments, the Address list field includes an address list including the respective shadow addresses associated with the respective hops of the path, wherein the Pointer field includes a value indicative of a next address in the address list to be processed. In at least some example embodiments, supporting communication of the source routed packet includes receiving, by the first node, an indication of the actual addresses of the path, generating, by the first node based on the indication of the actual addresses of the path, the encoding of the path, associating, by the first node, the encoding of the path with a payload to form the source routed packet, and forwarding, by the first node, the source routed packet toward a first hop of the set of hops of the path. In at least some example embodiments, the encoding of the path is generated based on a set of mappings of the actual addresses of the path to the respective shadow addresses associated with the respective hops of the path. In at least some example embodiments, supporting communication of the source routed packet includes receiving, by a node, the source routed packet, identifying, by the node, one of the hops of the path that is adjacent to the node, determining, by the node based on the respective shadow address of the one of the hops of the path that is adjacent to the node, the respective actual address of the one of the hops of the path that is adjacent to the node, and forwarding, by the node toward the one of the hops of the path based on the respective actual address of the one of the hops of the path, the source routed packet. In at least some example embodiments, the one of the hops of the path that is adjacent to the node is determined based on an offset value associated with the encoding of the path. In at least some example embodiments, the respective actual address of the one of the hops of the path that is adjacent to the node is determined based on a set of mappings of the respective shadow addresses associated with the respective hops of the path to the actual addresses of the path. In at least some example embodiments, supporting communication of the source routed packet includes receiving, by the second node, the source routed packet, determining, by the second node based on the encoding of the path, that the second node is an egress node of the path, removing, by the second node from the source routed packet based on the second node being the egress node of the path, the encoding of the path from the source routed packet to form a packet, and forwarding, by the second node, the packet.

In at least some example embodiments, an apparatus includes means for supporting communication of a source routed packet from a first node to a second node using a path composed of a set of hops having a respective set of actual addresses associated therewith, wherein the source routed packet includes an encoding of the path, wherein the encoding of the path includes an encoding of a respective set of shadow addresses associated with the respective hops of the path, wherein the respective shadow addresses associated with the respective hops of the path are shorter than the respective actual addresses for the respective hops of the path. In at least some example embodiments, the set of hops of the path includes at least one of at least one strict hop and at least one loose hop. In at least some example embodiments, the respective actual addresses for the respective hops of the path include Internet Protocol (IP) addresses, Multiprotocol Label Switching (MPLS) labels, or Media Access Control (MAC) addresses. In at least some example embodiments, the respective shadow addresses associated with the respective hops of the path are based on hashing of the respective actual addresses for the respective hops of the path. In at least some example embodiments, the actual addresses for the respective hops of the path include Internet Protocol version 6 (IPv6) addresses and the shadow addresses associated with the respective hops of the path include Internet Protocol version 4 (IPv4) addresses. In at least some example embodiments, the encoding of the path includes an indication that the path is encoded within the source routed packet using the respective shadow addresses associated with the respective hops of the path rather than the respective actual addresses for the respective hops of the path. In at least some example embodiments, the encoding of the path is included within an Internet Protocol version 6 (IPv6) Extension Header (EH). In at least some example embodiments, the encoding of the path is included within a Hop-by-Hop Options Header. In at least some example embodiments, the Hop-by-Hop Options Header includes a Next Header field, a Header Extension Length field, and an Options field, wherein the Options field includes an Option Type field, an Option Data Length field, and an Option Data field, wherein the Option Data field includes an address list including the respective shadow addresses associated with the respective hops of the path. In at least some example embodiments, the encoding of the path is included within an Internet Protocol version 6 (IPv6) Shim Header disposed between an IPv6 Header and a transport layer protocol header. In at least some example embodiments, the IPv6 Shim Header includes a Type field, a Length field, a Next Header field, and a Payload field, wherein the Payload field includes a Pointer field and an Address list field. In at least some example embodiments, the Address list field includes an address list including the respective shadow addresses associated with the respective hops of the path, wherein the Pointer field includes a value indicative of a next address in the address list to be processed. In at least some example embodiments, the means for supporting communication of the source routed packet includes means for receiving, by the first node, an indication of the actual addresses of the path, means for generating, by the first node based on the indication of the actual addresses of the path, the encoding of the path, means for associating, by the first node, the encoding of the path with a payload to form the source routed packet, and means for forwarding, by the first node, the source routed packet toward a first hop of the set of hops of the path. In at least some example embodiments, the encoding of the path is generated based on a set of mappings of the actual addresses of the path to the respective shadow addresses associated with the respective hops of the path. In at least some example embodiments, the means for supporting communication of the source routed packet includes means for receiving, by a node, the source routed packet, means for identifying, by the node, one of the hops of the path that is adjacent to the node, means for determining, by the node based on the respective shadow address of the one of the hops of the path that is adjacent to the node, the respective actual address of the one of the hops of the path that is adjacent to the node, and means for forwarding, by the node toward the one of the hops of the path based on the respective actual address of the one of the hops of the path, the source routed packet. In at least some example embodiments, the one of the hops of the path that is adjacent to the node is determined based on an offset value associated with the encoding of the path. In at least some example embodiments, the respective actual address of the one of the hops of the path that is adjacent to the node is determined based on a set of mappings of the respective shadow addresses associated with the respective hops of the path to the actual addresses of the path. In at least some example embodiments, the means for supporting communication of the source routed packet includes means for receiving, by the second node, the source routed packet, means for determining, by the second node based on the encoding of the path, that the second node is an egress node of the path, means for removing, by the second node from the source routed packet based on the second node being the egress node of the path, the encoding of the path from the source routed packet to form a packet, and means for forwarding, by the second node, the packet.

BRIEF DESCRIPTION OF THE DRAWINGS

The teachings herein can be readily understood by considering the following detailed description in conjunction with the accompanying drawings, in which:

FIG. 3 depicts an example embodiment of private-use IP4 address blocks for use as shadow addresses source routing;

FIG. 6 depicts an example embodiment of a shadow address table (SAT) configured to support mappings of IPv4 shadow addresses to IPV6 actual addresses;

FIG. 7 depicts an example embodiment of an inverse shadow address table (I-SAT) configured to support mappings of actual addresses to shadow addresses;

FIG. 17 depicts an example embodiment of an IP-Shim Header for use to support communication based on use of shadow addresses in source routing;

FIG. 18 depicts an example embodiment of an IPv4-mapped-IPv6-SSR Shim Header for use as a payload in the IP-Shim Header to support communication based on use of shadow addresses in source routing;

To facilitate understanding, identical reference numerals have been used herein, wherever possible, in order to designate identical elements that are common among the various figures.

DETAILED DESCRIPTION

Various example embodiments for supporting source routing are presented herein. Various example embodiments for supporting source routing may be configured to support source route compression for source routing. Various example for supporting source route compression for source routing may be configured to support source route compression for source routing based on use of shadow addresses. Various example for supporting source route compression for source routing based on use of shadow addresses may be configured to support source routing of packets based on use of shadow addresses (e.g., shorter addresses relative to actual addresses) of hops in place of actual addresses (e.g., longer addresses relative to shadow addresses) of hops to encode source routes within source routed packets, thereby compressing the source routes within the source routed packets and, thus, providing source route compression. Various example for supporting source route compression for source routing based on use of shadow addresses may be configured to support communication of a source routed packet from a first node to a second node using a source routed path composed of a set of hops having a respective set of actual addresses associated therewith, wherein the source routed packet includes an encoding of the source routed path, wherein the encoding of the source routed path includes an encoding of a respective set of shadow addresses associated with the respective hops of the source routed path, wherein the respective shadow addresses associated with the respective hops of the source routed path are shorter than the respective actual addresses for the respective hops of the source routed path. It will be appreciated that these and various other example embodiments and advantages or potential advantages of supporting source routing may be further understood by way of reference to the various figures, which are discussed further below.

Figure 1:
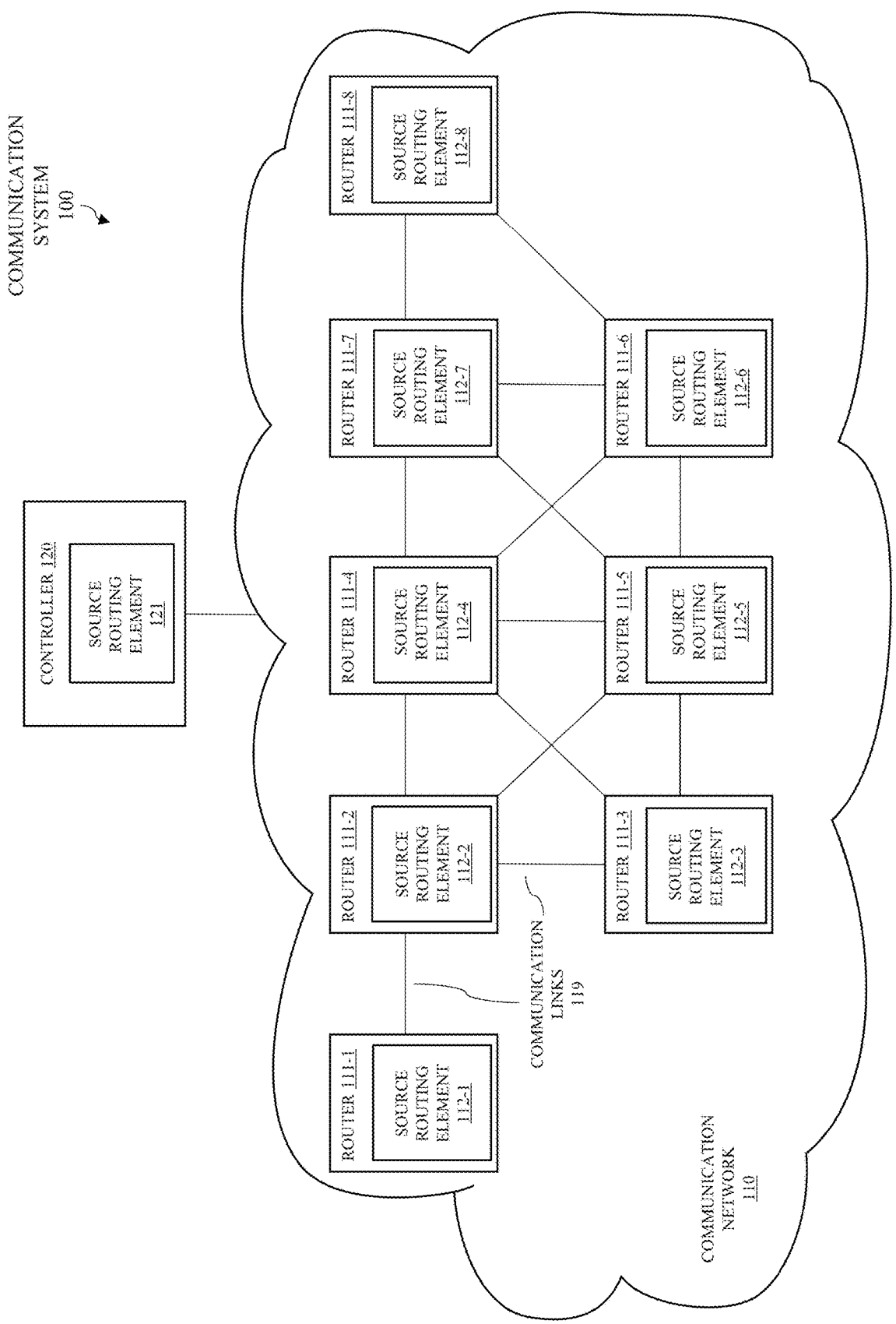
FIG. 1 depicts an example embodiment of a communication system configured to support communication based on source route compression based on use of shadow addresses in source routing.

FIG. 1 depicts an example embodiment of a communication system configured to support communication based on source route compression based on use of shadow addresses in source routing.

The communication system 100 includes a communication network 110 and a controller 120. The communication network 110 is a packet-switched network including a set of routers 111-1-111-8 (collectively, routers 111, which are also referred to herein using the notation Rx) and a set of communication links 119 via which the routers 111 are communicatively connected. The communication network 110 is configured to support various data plane and control plane functions for supporting communication of traffic including communication of source routed packets. The communication network 110 is configured to support source routing of packets using source route compression. The communication network 110 is configured to support source routing of packets using source route compression based on use of shadow addresses (shorter addresses relative to the lengths of the actual addresses) of hops in the place of actual addresses (longer addresses relative to the lengths of the shadow addresses) of hops to encode source routes within source routed packets. The routers 111 are configured to support source routing of packets using source route compression. The routers 111-1-111-8 include source routing elements 112-1-112-8 (collectively, source routing elements 112), respectively, which are configured to support source routing of packets using source route compression. The controller 120 is configured to provide various control functions for the communication network 110 (e.g., maintaining network topology and traffic engineering information, computing source routes for ingress routers in the communication network 110, or the like, as well as various combinations thereof) including control functions configured to support source routing of packets by routers 111 of communication network 110 based on source route compression. The controller 120 includes a source routing element 121 configured to support source routing of packets, based on source route compression, by routers 111 of communication network 110. Various example embodiments for supporting source route compression within the communication network 110 may be further understood by first considering various aspects of packet switched networks configured to support source routing.

Packet-switched networks are built on mesh topologies in which multiple paths to a destination exist. The links in the mesh are point-to-point links joined by nodes. A path to a destination may go through any number of nodes, and the path may change at any time due to traffic problems or failed links. In this environment, there are two possible packet routing methods: hop-by-hop destination-based routing and source routing.

Hop-by-hop, destination-based routing is like getting directions along the way. A packet has a destination address. Each node looks at the address and makes a routing decision about how to forward the packet. Thus, decisions are made on a hop-by-hop basis in the network until the packet reaches its destination.

Source Routing, also called explicit path addressing, allows a head-end node to partially or completely specify the route the packet takes through the network. The head-end node discovers an explicit path for a packet flow through the network in advance of sending packets. The explicit path is "encoded" into the packet and transit nodes forward packet based on that path. Source Routing minimizes the states required in transit nodes to forward a packet, since each node only maintains forwarding information to one of its next-hops and is not require to maintain forwarding information to each possible packet destination. An example of a generic method of source routing, described within the context of FIG. 2, follows.

Figure 2:
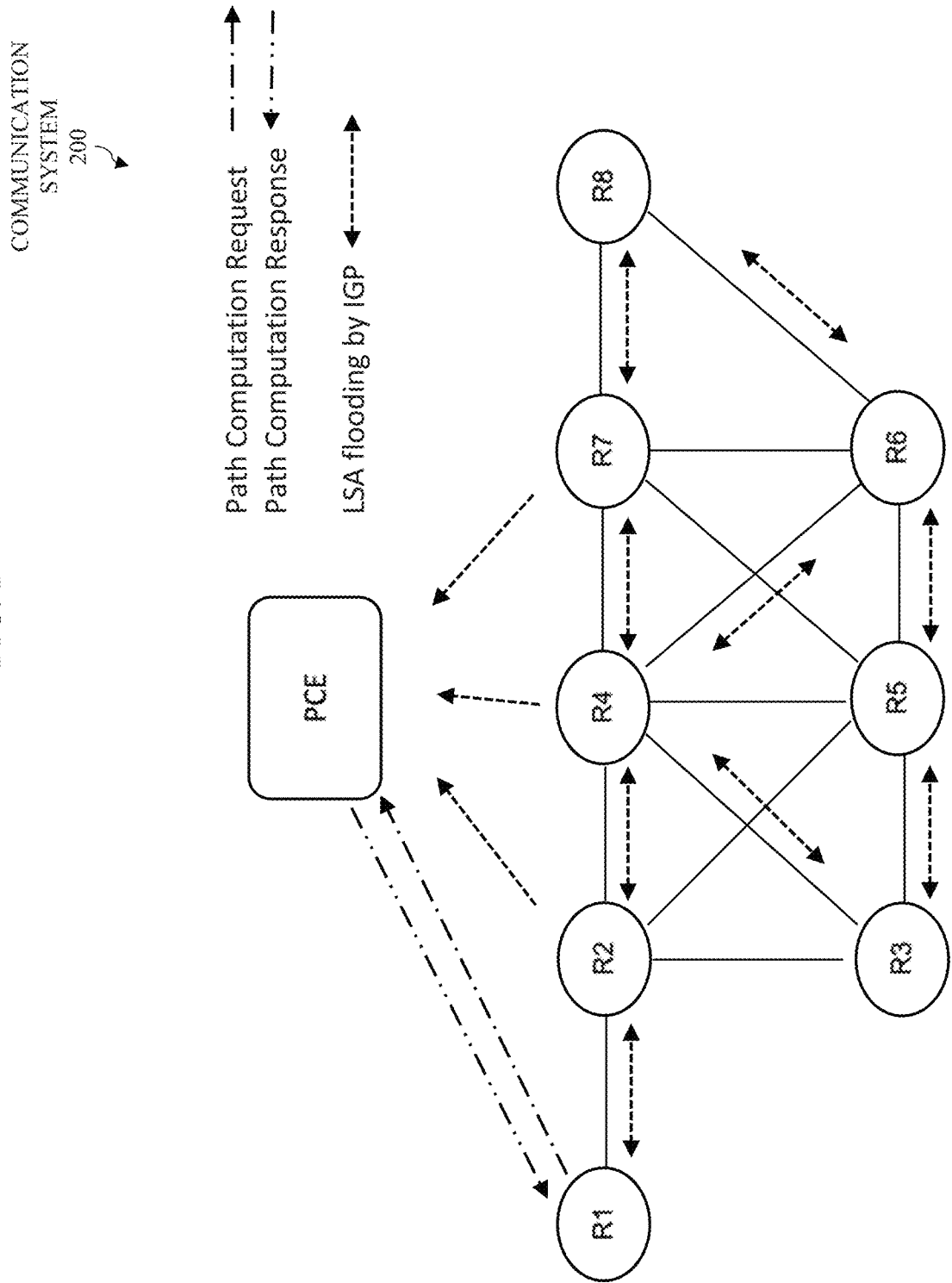
FIG. 2 depicts an example embodiment of a communication system configured to support communication based on source route compression based on use of shadow addresses in source routing.

FIG. 2 depicts an example embodiment of a communication system configured to support communication based on source route compression based on use of shadow addresses in source routing In FIG. 2, communication system 200 is similar to the communication system 100 of FIG. 1. The communication system 200 includes the same routers as in FIG. 1, and includes a PCE configured to operate as the controller of FIG. 1.

In FIG. 2, for a generic method of source routing, assume that R1 (head-end node) decides to send a packet along the path R1-R2-R4-R7-R8. Assume that R1, R2, R3 . . . , R8 are loopback addresses assigned as node identifiers. So, R1 encodes the explicit path with node identifiers as {R2, R4, R7, R8} into the packet and sends to R2. When R2 receives the packet, it pops the first hop in the explicit path, which is R2, since it identifies itself. It then looks up the next-hop in the explicit path, which is R4, and forwards the packet to R4 with the explicit path in the packet as {R4, R7, R8}. R4 pops the first hop in the explicit path, which is R4, since it identifies itself. Then R4 looks up the next-hop in the explicit path, which is R7, and forwards the packet to R7 with the explicit path {R7, R8}. When R7 receives the packet, it pops the first hop, which is R7, since it identifies itself. Then R7 looks up the next-hop in the explicit path, which is R8, and forwards the packet to R8 with the explicit path {R8}. When R7 receives the packet, it pops the first hop, which is R8, since it identifies itself. The explicit path has become empty, which means the packet has traversed the explicit path. R8 makes further forwarding decision on the packet based on its native header. As discussed further below, source routing may be performed using a loose source routing and/or a strict source routing.

In loose source routing, the head-end node can encode a set of nodes to be traversed and intermediate nodes along the path can choose among multiple paths to reach any nodes in the set of nodes. For example, in the example of the generic method of source routing described above, R2 may find the "optimal" path to R4 is via R2-R3-R4 instead of R2-R4. In this case, R2 will send the packet with explicit path {R3, R4, R7, R8} to R3. When R3 receives the packet and finds the first hop in the path as R3, it would pop R3 since R3 identifies itself. R3 further looks up the next-hop in the explicit path, which is R4, and sends the packet with explicit path {R4, R7, R8} to R4. So, when an explicit path contains one or more node identifier(s) then the path is called a loose source route since an intermediate node can choose one among the multiple paths to reach the a node, which is a loopback address in that node.

In strict source routing, the head-end node can encode a set of hops to be traversed and intermediate nodes along the path forward based on the specified hops. For example, in the example of the generic method of source routing described above, R1 encodes a set of next-hop identifiers such as {R2→R4, R4→R7, R7→R8} to specify the path to be taken by the packet. Note that the first hop R1→R2 is not encoded into the path since it is already traversed when R1 forwards the packet on the R1→R2 link. When R2 receives the packet, it pops the first hop, which is R2→R4, from the path since it identifies a locally connected link. R2 then forwards the packet on R2→R4 link. When R4 receives the packet, it pops the first hop, which is R4→R7, from the path since it identifies a locally connected link. R4 forwards the packet on the R4→R7 link. When R7 receives the packet, it pops the first hop, which is R7→R8, from the path since it identifies a locally connected link. R7 forwards the packet without an explicit path on the R7→R8 link. In this manner, the exact path traversed by the packet is specified by the source node R1.

It will be appreciated, as indicated above, that a source node also may specify a mix of loose hops and strict hops. For example, in the example of the generic method of source routing described above, R1 can also specify a mix of strict and loose hops such as {R2→R4, R8}. It will be appreciated that strict source routing is preferable when a packet belonging to a service or application that needs to meet strict Quality of Service (QoS) or Service Level Agreement (SLA) and, thus, must follow a strict path. So, strict source routing is the default choice for source routing with traffic engineering (TE). A description of source routing with traffic engineering (SR-TE) follows.

In SR-TE, various TE parameters are assigned into the network elements (e.g., the nodes and links). The TE parameters of a network element describe the cost, delay, throughput, available bandwidth, packet loss characteristics etc. of the network element. The topology and TE parameters of all network elements are learned and are maintained in a centralized TE Database (TEDB) hosted by a controller (e.g. a Path Computation Element (PCE), a Software Defined Networking (SDN) controller, or the like). The controller can learn TE and topology information by listening to link-state advertisements (LSAs) from the Interior Gateway Protocol (IGP) running among the routers (e.g., Intermediate-System-to-Intermediate-System (ISIS), Open Shortest Path First (OSPF), or the like). The controller can also gather such information from the routers, e.g., using Border Gateway Protocol-Link State (BGP-LS) such as in RFC 7752, using a push/pull mechanism or the like, as well as various combinations thereof.

In SR-TE, the head-end node classifies packets into flows based on application or a service. Each flow is associated with specific QoS requirement or SLA. The head-end node sends a request to the controller (e.g., PCE, SDN controller, or the like) to compute an optimal/explicit path that meets the specified QoS/SLA. The controller typically computes such a path by running Constraint Shortest Path First (CSPF) techniques on the TE DB. Once a path is allocated, the controller updates the dynamic TE state (e.g. residual bandwidth) of the network elements along that path into the TEDB. The head-end node sends all packets belonging to a flow over the explicit path that meets the QoS/SLA of the flow. The explicit path is encoded into the packet. Thus, it is possible that packets of different flows to same destination follow diversified paths. The per-flow states are maintained only at the head-end node and transit nodes are completely agnostic of a flow, the QoS/SLA needs of the flow, and so forth. This results in a significant reduction of cost and complexity at transit nodes.

In recent years, Source Routing, which was typically used for Internet Protocol version 4 (IPv4), has been revamped as Segment Routing (SR) by extending source routing capabilities into Multiprotocol Label Switching (MPLS) and IP version 6 (IPv6). In SR, the loopback address of a router is referred to as a "Prefix Segment" and next-hop adjacency/ link between two routers is referred to as an "Adjacency Segment". In SR, each segment is assigned a Segment Identifier (SID), which is encoded into an explicit path to identify the segment. SR using an MPLS dataplane is described in RFC 8660 and SR using an IPv6 dataplane is described in RFC 8754. There is no explicit specification for SR using an IPv4 dataplane, since SR uses the IPv4 source routing described in the base IPv4 specification RFC 791. It is noted that, since SR includes SR-TE aspects, the term "SR" as used herein, unless indicated otherwise, includes SR-TE as well.

In SR using an MPLS dataplane, packet flows are enforced through a specific path by applying, at the ingress node, a specifically designed stack of segment identifiers (SIDs) fully compatible with the MPLS data plane. The stack of SIDs is referred to as a "segment list" and corresponds to the stack of labels in the MPLS architecture. The ingress router sends a packet with the list of SIDs (stack of labels) wherein each SID indicates a next-hop or router to be traversed by the packet. Only the top SID in the list is processed during packet forwarding by transit nodes. Each packet is forwarded along the shortest path toward the network element represented by the top SID. For example, a Prefix-SID can represent an Equal Cost Multipath (ECMP)-aware shortest-path to an IGP prefix (i.e., IGP-Prefix) which identifies a specific router (i.e., IGP-Node Segment). For example, an Adjacency-SID represents a hop over a specific adjacency between two nodes in the IGP (i.e., IGP-Adjacency Segment). A Prefix Segment is typically a multi-hop path while an Adjacency Segment, in most cases, is a one-hop path. Unlike traditional MPLS networks, SR maintains per-flow state only at the ingress node, where the segment list is applied. Therefore, no signaling protocol (e.g., Resource Reservation Protocol with traffic engineering extensions—RSVP-TE) is required to populate the forwarding table of transit nodes. In this way, a simplified control plane is employed, just relying on the IGP that is properly extended to advertise SIDs as additional attributes of LSAs. Thus, scalability of transit nodes is greatly improved, since MPLS Label Switch Paths (LSPs) state information is not required.

In SR using an IPv6 dataplane, similar to SR using an MPLS dataplane, packet flows are enforced through a specific path by applying, at the ingress node, a specifically designed stack of SIDs. In SR using an IPv6 dataplane, however, SIDs are encoded into the packet as IPv6 addresses assigned to Adjacency Segments or Node Segments.

In SR-TE, a strict-hop path would consist of a stack of Adjacency-SIDs where each such SID will designate a strict hop to be traversed. Thus, in SR, a packet traversing 30 strict next-hops will start from the head-end with a label stack of 30 labels in an MPLS dataplane and list of 30 IPv6 addresses in an IPv6 dataplane.

In SR in Ethernet networks, packet flows are enforced through a specific path by applying, at the ingress node, a specifically designed stack of Media Access Control (MAC) addresses where each MAD address identifies a hop in the path to be traversed.

It is noted that, herein, generic source routing specific terminology, rather than SR-specific terminology, is primarily used. For example, a node or a link between two nodes, unless otherwise specified, is generically referred to herein as a "network element" and a network element encoded in the source route is referred to as a "hop" in the source routed path.

Various example embodiments are configured to support a compressed form of encoding a source route into a packet, which can be applied to any packet switching technology. In existing source routing (or segment routing), the source route is encoded as an ordered list of network elements (nodes and/or next-hops) in the path, where each network element is encoded by the network element address assigned to the network element by the addressing scheme of the packet switching technology. For example, the address is an IPv4 address in an IPv4 network, an IPv6 address in an IPv6 network, an MPLS label in an MPLS network, a MAC address in Ethernet network, and so forth. Additionally, various example embodiments for source route compression as presented herein additionally assign a "shadow address" to each network element such that the shadow address of the network element (which may be referred to as the short address or the shorter address) is shorter than the actual address of the network element (which may be referred to herein as the long address or the longer address). The shadow addresses of the network elements may be established in various ways as long as the values of the shadow addresses are unique. For example, the shadow address associated with an actual address of a network element may be obtained by using or assigning an second address to the network element for use as the shadow address for the network element (e.g., using or assigning an IPv4 address of a network element as the shadow address for the network element when an IPv6 address of the network element is used as an actual address of the network element). For example, the shadow address associated with an actual address may be obtained based on a hash computation on the actual address (e.g., as along as the hashing technique ensures network wide unique shadow addresses for the nodes to ensure that the node addresses on the source route are network-wide unique). It will be appreciated that shadow addresses of the network elements may be obtained in various other ways.

The mappings between the actual addresses of the network elements and the shadow addresses of the network elements may be distributed across the network for use by the nodes of the network to build source routes for source routed packets based on shadow addresses and to handle propagation of source routed packets based on shadow addresses. The mappings between the actual addresses of the network elements and the shadow addresses of the network elements may be distributed across the network in various ways, such as by using an Interior Gateway Protocol (IGP) running in the network (e.g., as part of a link state advertisement (LSA) associated with the actual address of a network element), configured in each node (e.g., automatically by a centralized controller), or the like, as well as various combinations thereof. The nodes of the network build and maintain shadow address tables (SATs) that provide mappings of shadow addresses to actual addresses for network elements (e.g., for all network elements in the network including all nodes in the network and all next-hops in the network, or at least for all nodes in the network and directly connected next-hops from the perspectives of the nodes where the SATs are being built and maintained). The ingress node(s) of the network also build and maintain inverse SATs (I-SATs) that provide mappings of actual addresses to shadow addresses that can be used by the ingress node(s) for building the compresses source routes based on shadow addresses that enable compressed source routing. The ingress node of a source route encodes the ordered list of network elements by their shadow addresses with the indication that the source route is encoded with shadow addresses instead of actual addresses, and this source route that is encoded based on shadow addresses is referred to herein as a Shadow Source Route (SSR). During packet forwarding over the source routed path, based on the indication that a packet includes an SSR, each receiving node along the path translates its respective next-hop shadow address in the SSR to its actual address by looking up the SAT, identifies the next-hop based on the actual address, and then forwards the packet to the next-hop, and this process is repeated at every node along the source routed path until the packet reaches the egress node, wherein the SSR is removed and the packet is further processed based on its native header.

Various example embodiments may be configured to support the concept of assigning a shadow address to an actual address of a network element and then encoding a source route with shadow addresses of the network elements in the source routed path. The shadow addresses of the network elements in the source routed paths may be encoded within source routed packets in various ways. For example, the shadow addresses of the network elements in the source routed paths may be encoded within source routed packets using one or more fields or one or more existing headers, using one or more new headers, or the like, as well as various combinations thereof. For example, the shadow addresses of the network elements in the source routed paths may be encoded within source routed packets by encoding the shadow addresses in the native header of the packet switching technology of the source routed packets, as opposed to using a non-native layer added atop the packet switching technology. It will be appreciated that the shadow addresses of the network elements in the source routed paths may be encoded within source routed packets in various other ways.

In at least some example embodiments of source routing within IPv6, IPv4 addresses may be used as shadow addresses. It will be appreciated that 32-bit shadow IPv4 addresses can address up to $2^{32}$ network elements, which is expected to be much more than needed for any source routed network. It will be appreciated that the 32-bit shadow IPv4 addresses may be obtained in various ways. In at least some example embodiments, for example, since the network is based on IPv6 and shadow IPv4 addresses are used as dummy addresses rather than actual addresses, the shadow IPv4 addresses may be assigned from "special" IPv4 address spaces such as those illustrated in the special address blocks 300 of FIG. 3. In at least some example embodiments, for example, the shadow IPv4 addresses can be obtained by a hash computation on the IPv6 addresses, as long as the hashing scheme ensures generation of network wide unique shadow IPv4 addresses for the nodes. Then the SSR is encoded as an ordered list of shadow IPv4 addresses of the network elements as an extension to the IPv6 header. This scheme of SSR encoding is referred to herein as "IPv4-mapped-IPv6-SSR". On receiving the IPv6 packet, each node along the path translates its respective next-hop shadow IPv4 address in the SSR to the actual IPv6 address based on SAT, identifies the next-hop based on the IPv6 address, and forwards the IPv6 packet to the next-hop identified based on the IPv6 address. With this scheme, an IPv6 source route with 30 hops will only consume 120B (30×4B-of-IPv4 address) instead 480B (30×16B-of-IPv6-address), i.e., the IPv6 source route is compressed by 75%. Various example embodiments may be configured to support configuration of a shadow address on a network element.

Figures 4, 5:
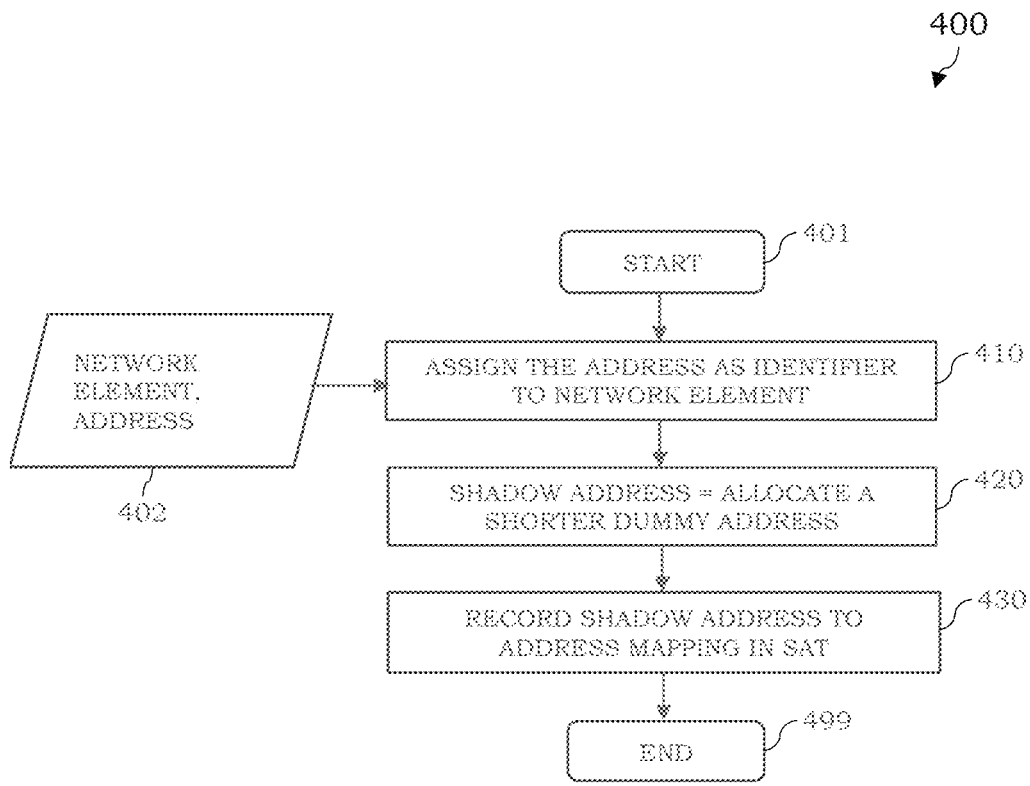
FIG. 4 depicts an example embodiment of a method for configuring an address on a network element for supporting communication based on use of shadow addresses in source routing.
FIG. 5 depicts an example embodiment of a shadow address table (SAT) configured to support mappings of shadow addresses to actual addresses.

FIG. 4 depicts an example embodiment of a method for configuring an address on a network element for supporting communication based on use of shadow addresses in source routing. At block 401, the method 400 begins. The inputs 402 to the method 400 include the network element on which to configure the address and the address to be configured (which is an address of the packet switching topology). Block 410 assigns the address to the network element as its unique identifier in the network, and the method 400 then proceeds to block 420. Block 420 allocates a dummy address, which is shorter than the address of the network element, as the shadow address for the network element, and the method 400 then proceeds to block 430. Block 430 keeps a record of the mapping of the shadow address of the network element to the actual address that identifies the network element, in a Shadow Address Table (SAT). At block 499, the method 400 ends.

FIG. 5 depicts an example embodiment of a SAT configured to support mappings of shadow addresses to actual addresses. As depicted in FIG. 5, the SAT 500 maintained by a node includes mappings of shadow addresses to actual addresses. This may be used to determine the forwarding of a packet to a network element (e.g., an immediate next-hop or a remote node via one or more intermediate hops) via a next hop, by determining an actual address of the network element based on a shadow address of the network element that is encoded within the packet. An example of a SAT in which IPv4 addresses are used as shadow addresses for actual IPv6 addresses is presented with respect to FIG. 6.

FIG. 6 depicts an example embodiment of a SAT configured to support mappings of IPv4 shadow addresses to IPV6 actual addresses. For example, as depicted in the SAT 600 of FIG. 6, the IPv4 address 10.10.10.1 is used as a shadow address to provide a more efficient encoding of the actual IPv6 address 2001:0db8:85a3:0000:0000:8a2e:0370:7334. For example, as depicted in FIG. 6, the IPv4 address 172.2.5.6 is used as a shadow address to provide a more efficient encoding of the actual IPv6 address 4002:0db8: 85a3:0000:0000:8a2e:9572:3742. It will be appreciated that such a SAT may be used to support IPv4-mapped-IPv6-SSR.

FIG. 7 depicts an example embodiment of an I-SAT configured to support mappings of actual addresses to shadow addresses. As depicted in FIG. 7, the I-SAT 700 maintained by an ingress node includes mappings of actual addresses to shadow addresses. This may be used to encode the source route within a packet using shadow addresses instead of actual addresses in order to reduce the overhead required for encoding the source route within the packet.

Various example embodiments may be configured to support various other functions for supporting configuration of a shadow address on a network element.

Various example embodiments may be configured to support distribution of a shadow address of a network element.

Figure 8:
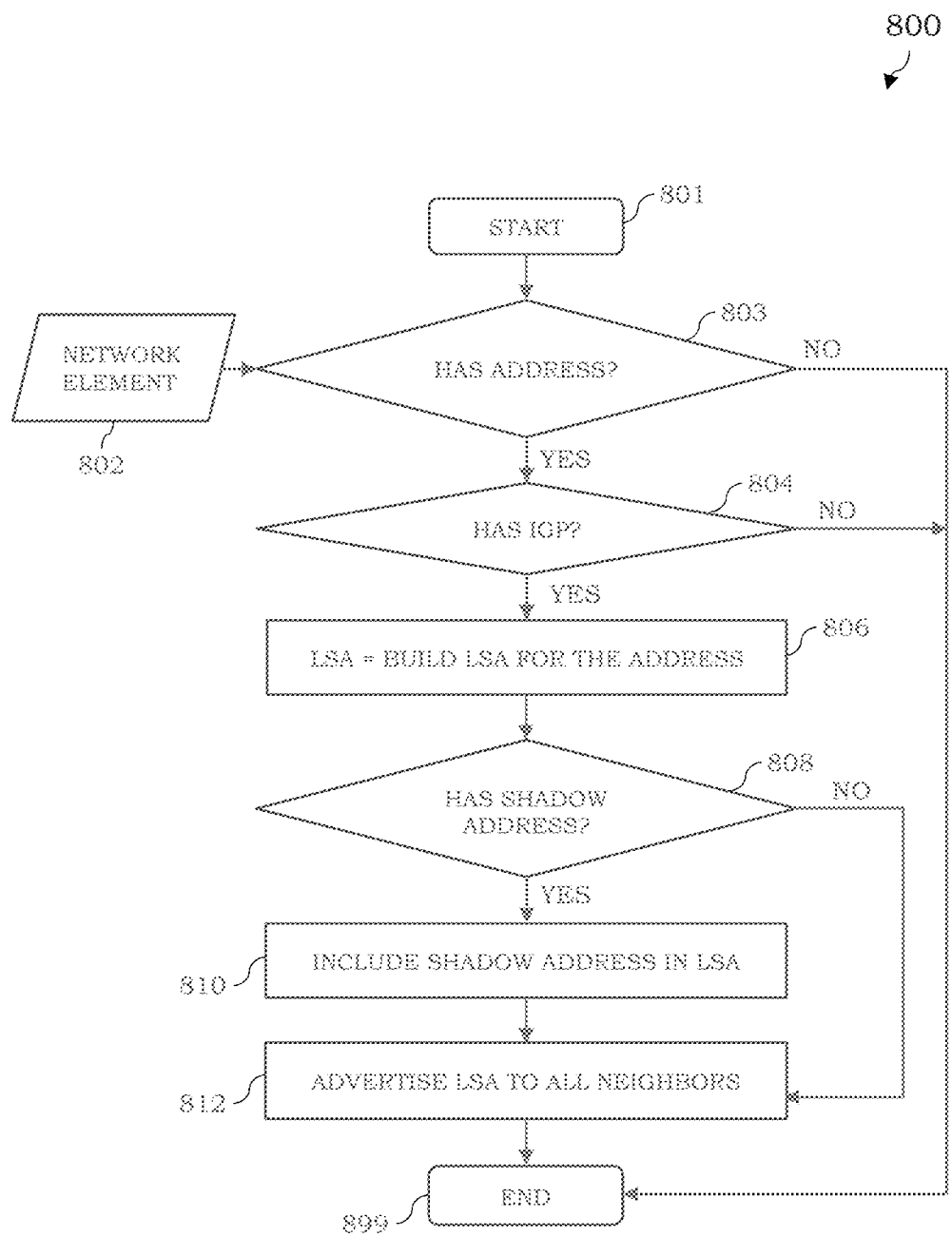
FIG. 8 depicts an example embodiment of a method for use by a node to distribute an address of a network element across a network.

FIG. 8 depicts an example embodiment of a method for use by a node to distribute an address of a network element across a network. It will be appreciated that the method 800 may be used if IGPs and/or other suitable protocols are enabled in the network to distribute LSAs for the network elements by the nodes of the network. At block 801, the method 800 begins. The input 802 to the method 800 is a network element in a node. Block 803 checks if an address is configured on the network element. If no address is configured on the network element then there is nothing more to do and the method 800 proceeds to block 899 where the method 800 ends, otherwise the method 800 proceeds to block 804. Block 804 checks if an IGP or its equivalent is configured in the node. If an IGP or its equivalent is not configured in the node then there is nothing more to do and the method 800 proceeds to block 899 where the method 800 ends, otherwise the method 800 proceeds to block 806. Block 806 builds the LSA for the address, and the method 800 then proceeds to block 808. Block 808 checks if the network element is configured with a shadow address. If the network element is configured with a shadow address then the method 800 proceeds to block 810, otherwise the method 800 proceeds to block 812. Block 810 includes the shadow address in the LSA, and the method 800 then proceeds to block 812. Block 812 advertises the LSA to all neighbors of the node. At block 899, the method 800 ends. It will be appreciated that, although primarily presented with respect to embodiments in which LSAs are used for distribution of shadow addresses, other suitable types of address advertisements may be used for distribution of shadow addresses.

Figure 9:
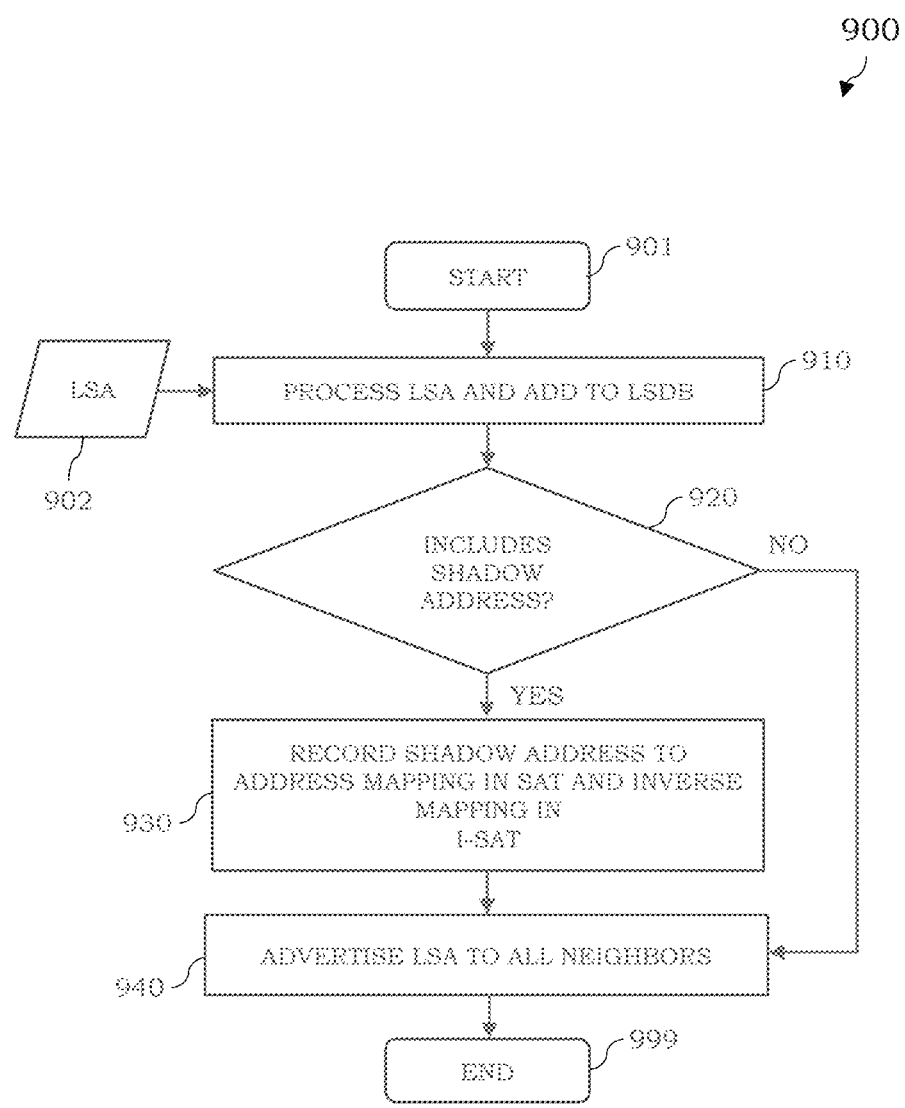
FIG. 9 depicts an example embodiment of a method for use by a node to process an address advertisement including an address of a network element being distributed across a network.

FIG. 9 depicts an example embodiment of a method for use by a node to process an address advertisement including an address of a network element being distributed across a network. At block 901, the method 900 begins. The input 902 to the method 900 is an LSA received from a neighbor. Block 910 performs existing operations for the LSA and adds the LSA to the LSDB, and the method 900 then proceeds to block 920. Block 920 checks if the LSA includes a shadow address. If the LSA includes a shadow address then the method 900 proceeds to block 930, otherwise the method 900 proceeds to block 940. Block 930 records the mapping of the shadow address to the actual address in the SAT of the node, and if the node is a potential ingress node then the node records the mapping of actual address to its shadow address in the I-SAT of the node. From block 930, the method 900 proceeds to block 940. Block 940 advertises the LSA to all neighbors. At block 999, the method 900 ends.

Various example embodiments may be configured to support various other functions for supporting distribution of a shadow address of a network element.

Various example embodiments may be configured to support communication of packets based on use of shadow addresses of network elements.

Figure 10:
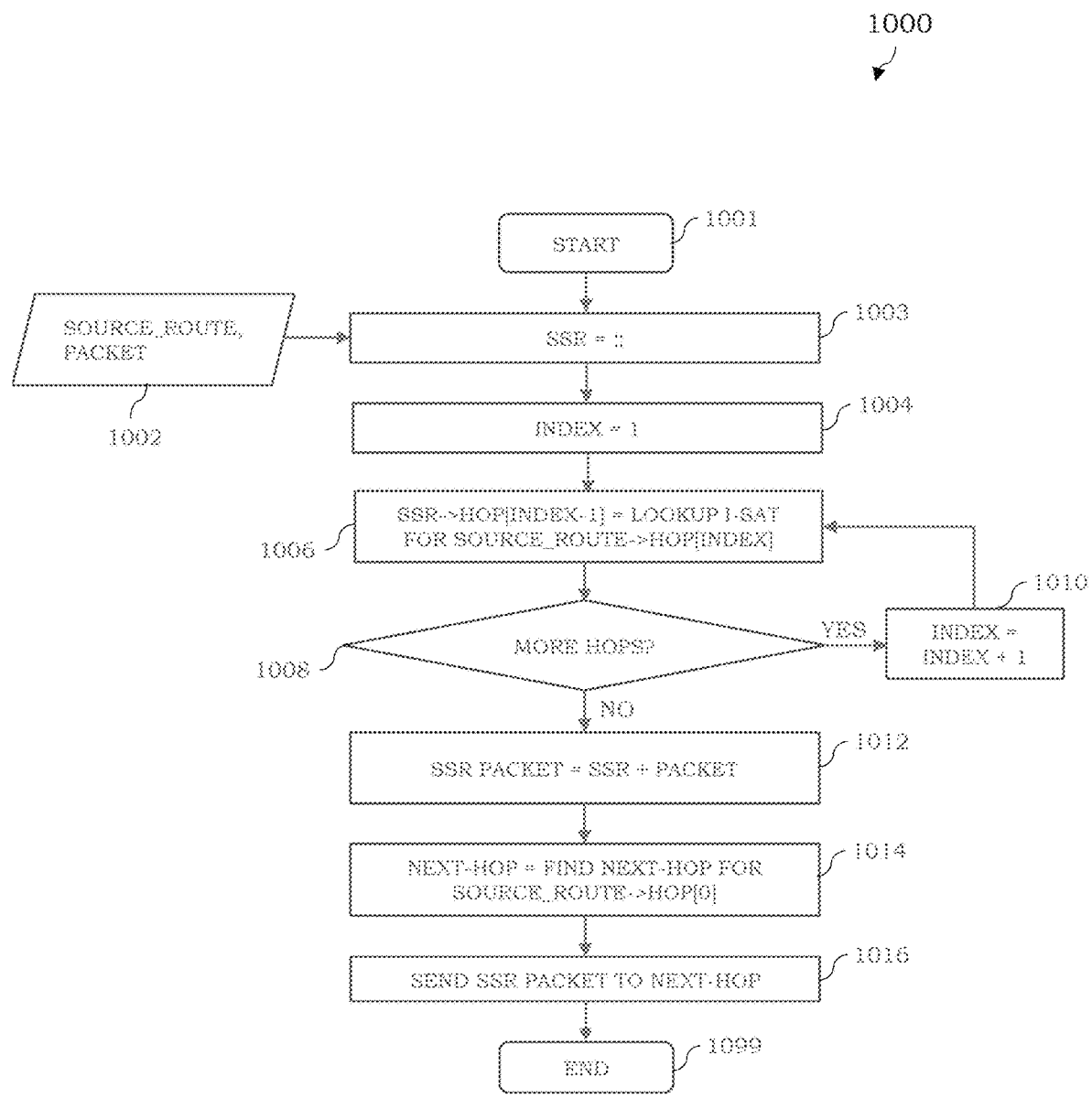
FIG. 10 depicts an example embodiment of a method for use by an ingress node to encode a source route into a packet as a shadow source route (SSR) to form an SSR packet.

FIG. 10 depicts an example embodiment of a method for use by an ingress node to encode a source route into a packet as an SSR to form an SSR packet. At block 1001, the method 1000 begins. The inputs 1002 to the method 1000 include (1) a source route including actual addresses of hops in the path and (2) the packet to be transmitted on the path. Block 1003 initializes an SSR with all hops as empty (e.g., value as 0), and the method 1000 then proceeds to block 1004. Block 1004 initializes an index variable to index into the hops in the source route as well as the SSR. The index is initialized to '1', which means the second hop in the source route (first hop is at index '0'), and the method 1000 then proceeds to block 1006. Block 1006 translates the actual address of the hop in the source route at the index into its shadow address by looking up the I-SAT, and then encodes the shadow address into the hop at 'index-1' in the SSR. From block 1006, the method 1000 proceeds to block 1008. Block 1008 checks if there are more hops in the source route to be evaluated. If there are no more hops in the source route to be evaluated then the method 1000 proceeds to block 1012, otherwise the method 1000 proceeds to block 1010. Block 1010 increments the value of the index variable by 1, and the method 1000 then returns to block 1006 to execute subsequent blocks for the next-hop. Block 1012 encodes the SSR into the packet, and the method 1000 then proceeds to block 1014. Block 1014 finds the immediate next-hop to reach the first hop in the source route (i.e., the hop at index '0' in the source route), and the method 1000 then proceeds to block 1016. Block 1016 sends the SSR packet to the immediate next-hop, and the method 1000 then proceeds to block 1099 where the method 1000 ends. At block 1099, the method 1000 ends.

Figure 11:
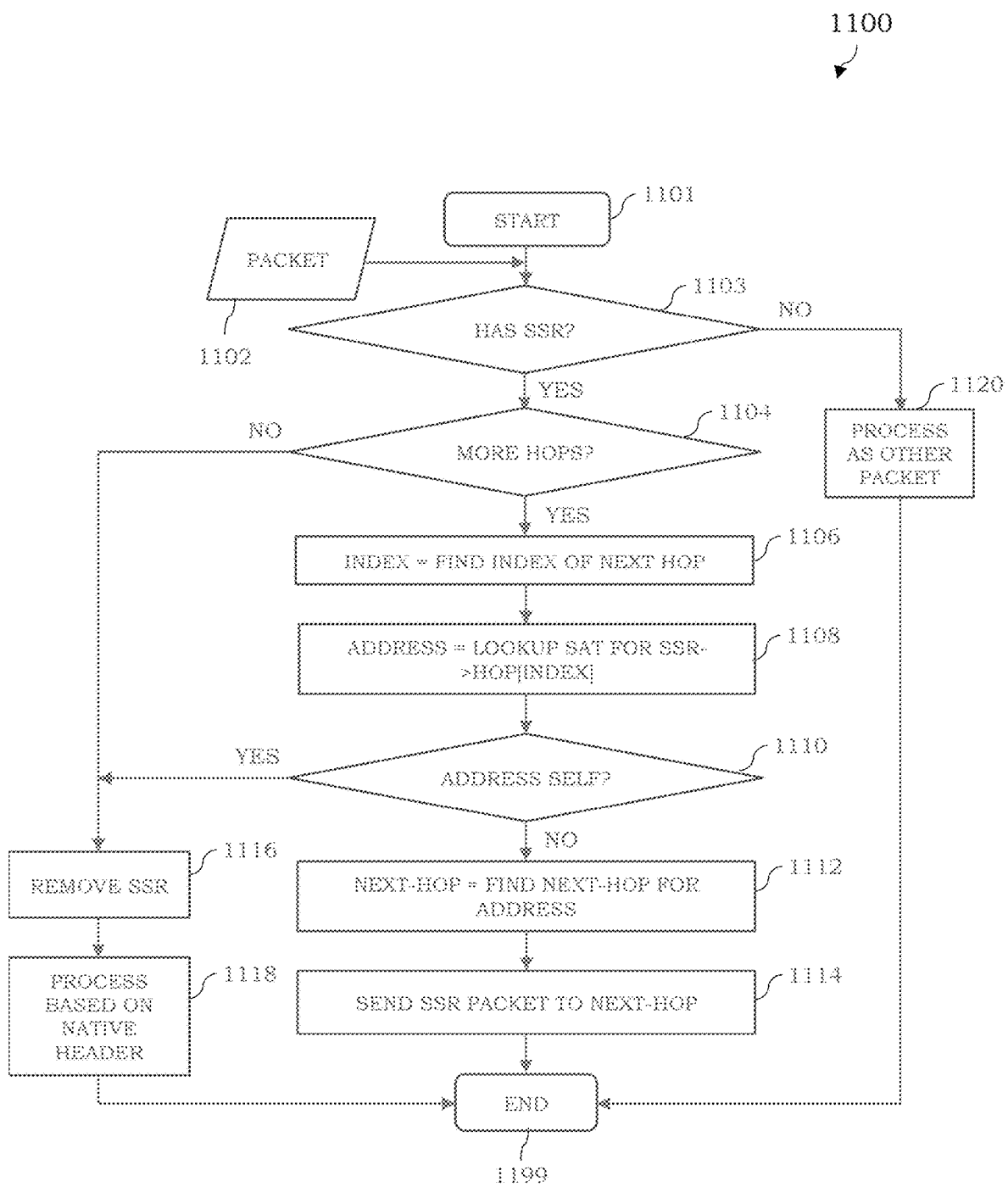
FIG. 11 depicts an example embodiment of a method for use by a transit node or an egress node to support processing of an SSR packet including a source route encoded as an SSR.

FIG. 11 depicts an example embodiment of a method for use by a transit node or an egress node to support processing of an SSR packet including a source route encoded as an SSR. At block 1101, the method 1100 begins. The input 1102 to the method 1100 is a packet received by a node, where the packet belongs to packet switching technology that implemeneted SSR. Block 1103 checks if the packet includes SSR. If the packet does not include SSR then the method 1100 proceeds to block 1120, otherwise the method 1100 proceeds to block 1104. Block 1120 processes the packet by existing means and then the method proceeds to block 1199 where the method 1100 ends. Block 1104 checks whether the SSR has more hops to be traversed. If SSR does not have any more hops to be traversed then it means this node is the egress node for the path and the method 1100 proceeds to block 1116, otherwise the method 1100 proceeds to block 1106. Block 1106 finds the hop in the SSR that is marked as the hop to be forwarded by this node, and the method 1100 then proceeds to block 1108. Block 1108 looks up the hop in the SAT to translate to the actual address, and the method 1100 then proceeds to block 1110. Block 1110 checks if the translated actual address is a local address address, which means that this node is the egress node for the path, then the method 1100 proceeds to block 1116, otherwise the method 1100 proceeds to block 1112. Block 1112 finds the immediate next-hop to reach the actual address (e.g., in IP networks, this can be done by looking up the Route Table containing the IP routes), and the method 1100 then proceeds to block 1114. Block 1114 sends the SSR packet to the immediate next-hop, and the method 1100 then proceeds to block 1199 where the method 1100 terminates. Block 1116 removes the SSR from the packet, and the method 1100 proceeds to block 1118. Block 1118 processes the packet based on its native header, and the method 1100 then proceeds to block 1199 where the method 1100 ends.

Various example embodiments may be configured to support various other functions for supporting communication of packets based on use of shadow addresses of network elements.

Various example embodiments may be configured to support implementation of SSR in IPv6 in various ways.

Various example embodiments may be configured to support implementation of SSR in IPv6 based on use of IPv6 Extension Headers (EHs). IPv6 supports several IPv6 Extension Headers (EHs) that can be appended to an IPv6 Header.

Figure 12:
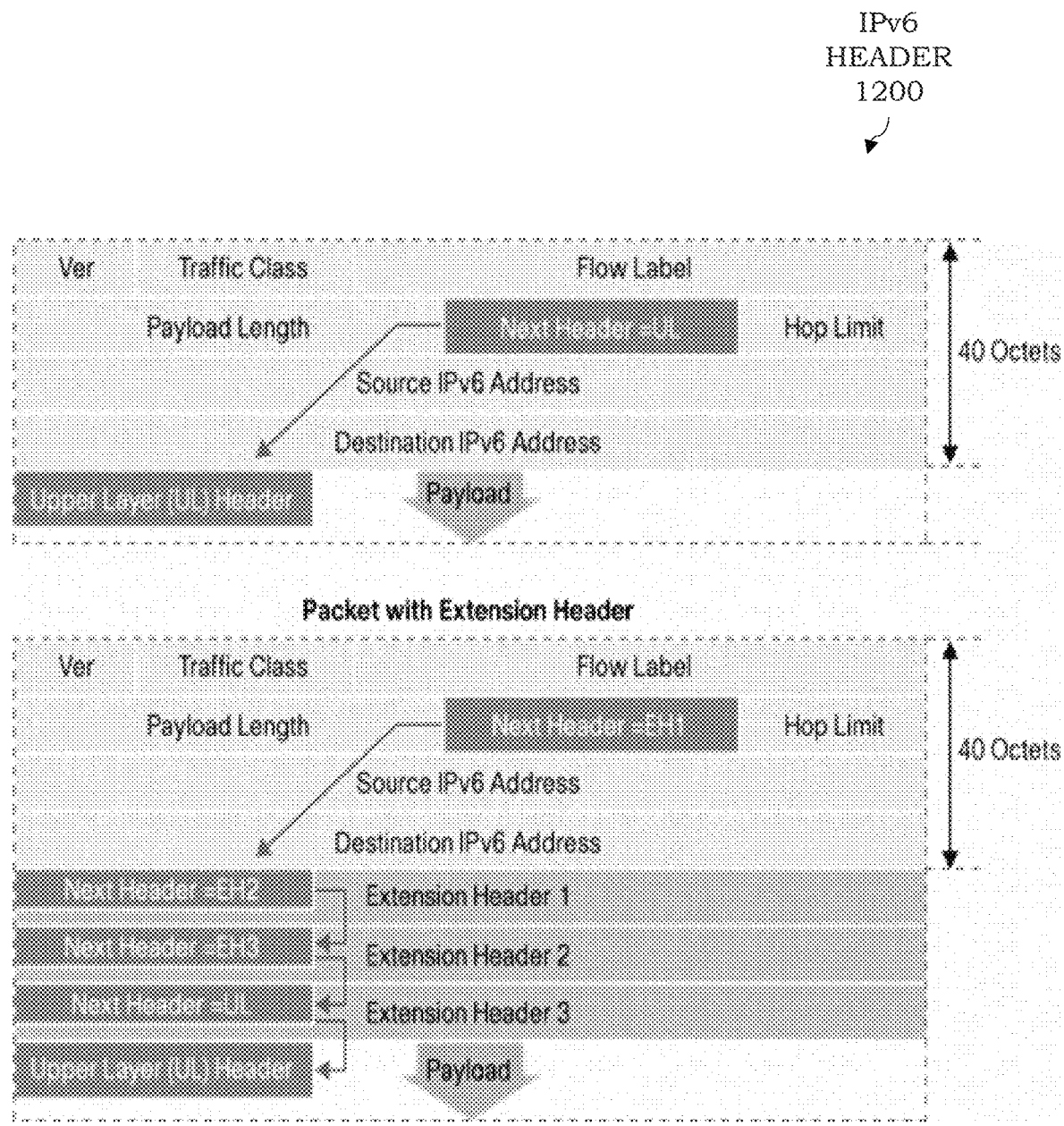
FIG. 12 depicts an example embodiment of an IPv6 Header configured for use to support communication based on use of shadow addresses in source routing.

FIG. 12 depicts an example embodiment of an IPv6 Header configured for use to support communication based on use of shadow addresses in source routing. The IPv6 Header 1200 remains fixed in size (40 bytes) while customized EHs are added as needed. The EHs provide for control functions needed or useful in some situations but unnecessary for the most common communications. For example, the EHs include provisions for timestamps, security, and special routing. Each EH starts with a 1-octet Next Header field, followed by its own body. The format of the body is dependent on the type of EH. The Next Header field of an EH points to the type of the next EH. So, multiple EHs are chained together by their Next Header fields. The Next Header field on the last EH in the chain indicates the type of the IPv6 payload. Section 4.3 in the IPv6 specification describes an EH referred to as a "Hop-by-Hop Options Header" that can be used to carry optional information that must be examined by each router along the delivery path of the packet. It is identified by the value of 0 in the Next Header field of the IPv6 Header. This EH is generic and multiple options can be defined within the EH. So, any special directive to be examined by each transit router of an IPv6 packet is defined as an option within the Hop-by-Hop Options Header. An example format of a Hop-by-Hop Options Header is presented with respect to FIG. 13.

Figure 13:
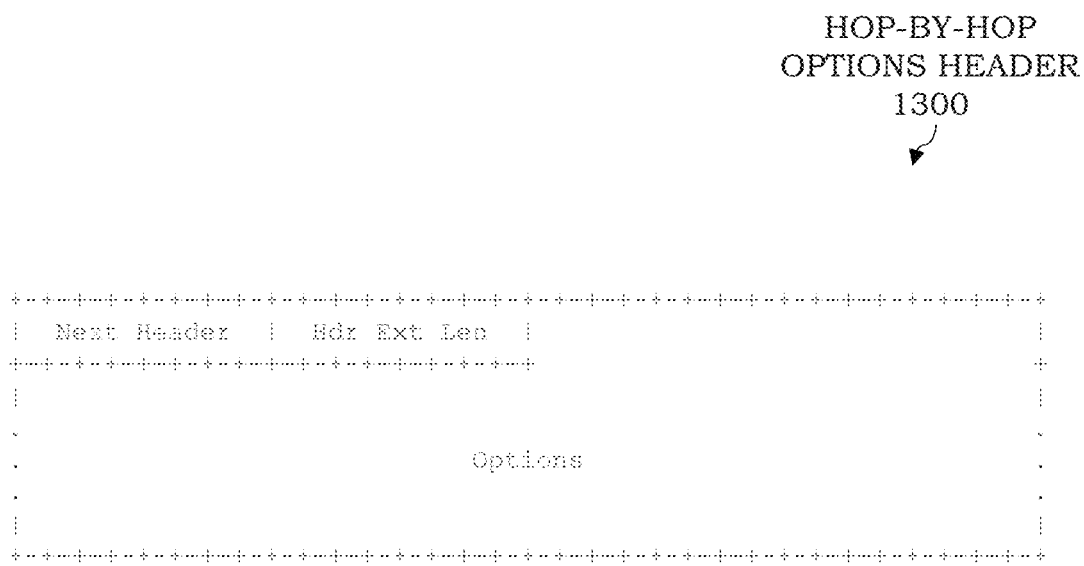
FIG. 13 depicts an example embodiment of a Hop-By-Hop Options Header for use in the IPv6 Header of FIG. 12 to support communication based on use of shadow addresses in source routing.

FIG. 13 depicts an example embodiment of a Hop-By-Hop Options Header for use in the IPv6 Header of FIG. 12 to support communication based on use of shadow addresses in source routing. The Hop-by-Hop Options Header 1300 includes a Next Header field, a Header Extension Length field, and an Options field. The Next Header is an 8-bit selector that identifies the type of header immediately following the Hop-by-Hop Options header 1300. The Header Extension Length field is an 8-bit unsigned integer that indicates the length of the Hop-by-Hop Options header in 8-octet units, not including the first 8 octets. The Options field is a variable-length field of length such that the complete Hop-by-Hop Options header is an integer multiple of 8 octets long. The Options field includes one or more TLV-encoded options. An example format of a TLV-encoded option configured for use in the Hop-By-Hop Options Header 1300 of FIG. 13, to provide a Path-ID to support communication based on use of shadow addresses in source routing, is presented with respect to FIG. 14.

Figure 14:
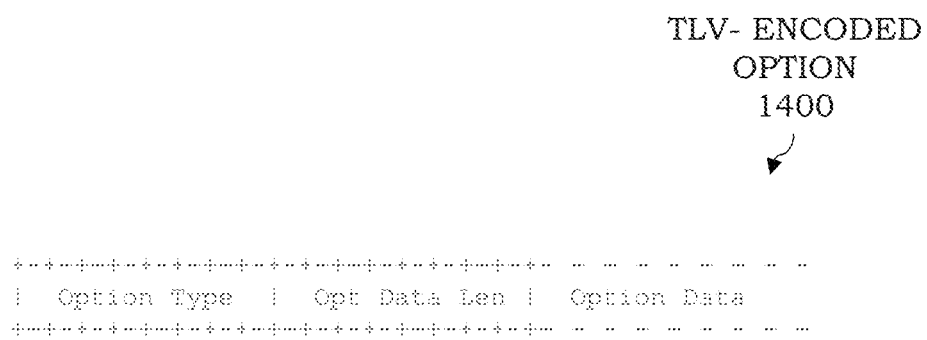
FIG. 14 depicts an example embodiment of a Type-Length-Value (TLV) encoded option for use in the Hop-By-Hop Options Header of FIG. 13 to support communication based on use of shadow addresses in source routing.

FIG. 14 depicts an example embodiment of a TLV-encoded option for use in the Hop-By-Hop Options Header of FIG. 13 to support communication based on use of shadow addresses in source routing The TLV-encoded option 1400 includes an Option Type field, an Option Data Length field, and an Option Data field. The Option Type field is an 8-bit identifier of the type of option. The Option Data Length field is an 8-bit unsigned integer that indicates the length of the Option Data field of this option, in octets. The Option Data field is a variable-length field that includes Option-Type-specific data.

The Hop-by-Hop Options Header, as indicated above, supports encapsulation of packets sent on stateful explicit paths in IPv6 networks. The sequence of Options within an IPv6 Header will be processed strictly in the order that the Options appear in the header. A receiver will not, for example, scan through the header looking for a particular kind of option and process that option prior to processing all preceding ones.

The Option Type identifiers are internally encoded such that the highest-order two bits specify the action to be taken if the processing IPv6 node does not recognize the Option Type: (a) 00—skip over this option and continue processing the header, (b) 01—discard the packet, (c) 10—discard the packet and, regardless of whether or not the Destination Address of the packet was a multicast address, send an ICMP Parameter Problem, Code 2, message to the Source Address of the packet, pointing to the unrecognized Option Type, and (d) 11—discard the packet and, only if the Destination Address of the packet was not a multicast address, send an ICMP Parameter Problem, Code 2, message to the Source Address of the packet, pointing to the unrecognized Option Type.

The Option Type identifiers are internally encoded such that the third-highest-order bit of the Option Type specifies whether or not the Option Data of that option can change en-route to the final destination of the packet: (a) 0—Option Data does not change en-route and (b) 1—Option Data may change en-route. When an Authentication Header (another type of EH that carries an authentication digest of the packet) is present in the packet, for any option whose data may change en-route, its entire Option Data field will be treated as zero-valued octets when computing or verifying the authenticating digest of the packet.

The three high-order bits described above are to be treated as part of the Option Type, not independent of the Option Type. That is, a particular option is identified by a full 8-bit Option Type, not just the low-order 5 bits of an Option Type. The Option Type for the Hop-by-Hop Options Header for supporting implementation of SSR in IPv6 based on use of an IPv4 addresses as shadow addresses is referred to herein an "IPv4-mapped-IPv6-SSR" Option. An example format of ab IPv4-mapped-IPv6-SSR Option is presented with respect to FIG. 15.

Figure 15:
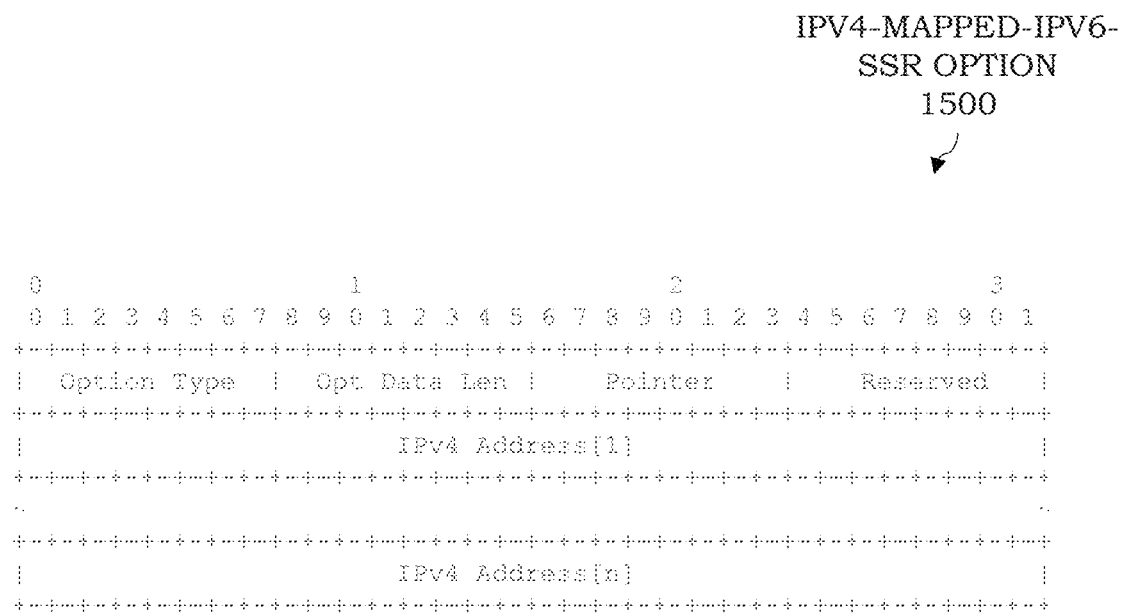
FIG. 15 depicts an example embodiment of an IPv4-mapped-IPv6-SSR Option, based on the TLV-encoded option of FIG. 14, for use in the Hop-By-Hop Options Header of FIG. 13 to support communication based on use of shadow addresses in source routing.

FIG. 15 depicts an example embodiment of an IPv4-mapped-IPv6-SSR Option, based on the TLV-encoded option of FIG. 14, for use in the Hop-By-Hop Options Header of FIG. 13 to support communication based on use of shadow addresses in source routing.

The IPv4-mapped-IPv6-SSR Option 1500 includes an Option Type field, an Option Data Length field, a Pointer field, a Reserved field, and an IPv4 Address List.

The Option Type field encodes the option type that indicates it as IPv4-mapped-IPv6-SSR Option. The highest-order 2-bits are encoded with the value 10, which indicates to discard the packet and, regardless of whether or not the Destination Address of the packet was a multicast address, send an ICMP Parameter Problem, Code 2, message to the Source Address of the packet, pointing to the unrecognized Option Type. The $3^{rd}$ highest order bit is encoded with the value 1, which indicates that the Option Data can change en-route, because the content of the SSR changes at each hop/router. The remaining 5-bits are assigned the value 10010, which results in the value of Option Type field as 0x32. The Option Data Length field is a 1-octet field having a variable value that indicates the length of the remaining bytes in the SSR option. The Pointer field is a 1-octet field that indicates the octet in IPv4 Address[ ] which begins the next offset to process. The pointer is relative to this option, and the smallest possible value for the Pointer is 8, which points to the 4th Octet, i.e., the area immediately after the Pointer field. The Reserved field is a 1-octet field that is reserved for future use, which is set to 0 by the sender and ignored by the receiver. The IPv4 Address List [1 . . . n] is a list of one or more IPv4 addresses, which is the ordered list of hops in the source route where each hop in the source route is encoded by its shadow (IPv4) address. It is noted that if the Pointer is greater than the Length then the SSR is considered to be traversed.

When a router routes an IPv6 packet that includes a Hop-by-Hop Options Header, it checks to see if the SSR option is present within the Header. If the SSR option is present, it parses the offset value beginning at the octet indicated by the Pointer and increments the Pointer by 4. If the Pointer exceeds the Option Data Length, then it means the SSR is already traversed.

Various example embodiments may be configured to support implementation of SSR in IPv6, based on use of IPv6 EHs, in various other ways.

Various example embodiments may be configured to support implementation of SSR in IPv6 based on use of an IP-Shim Protocol.

A generic IP-Shim Layer may be inserted between the IP header and the upper-layer/transport protocol header (e.g., Transmission Control Protocol (TCP), User Datagram Protocol (UDP), Internet Control Message Protocol (ICMP), or the like). The placement of the IP-Shim layer in the protocol stack is shown in FIG. 16.

Figure 16:
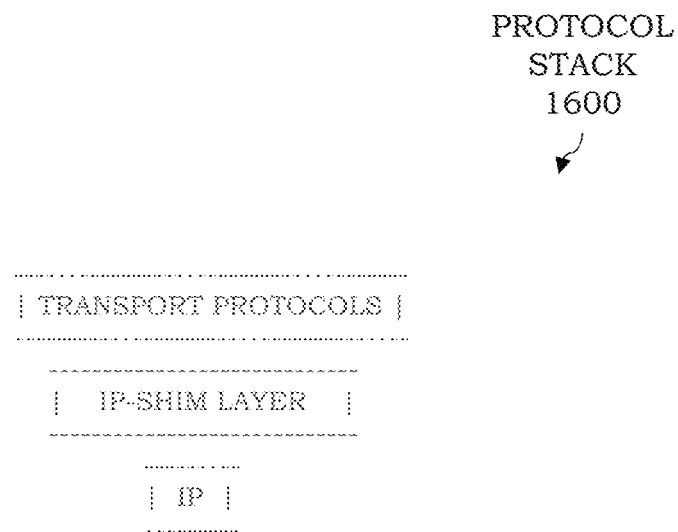
FIG. 16 depicts an example embodiment of a protocol stack for illustrating use of an IP-Shim Layer to support communication based on use of shadow addresses in source routing.

FIG. 16 depicts an example embodiment of a protocol stack for illustrating use of an IP-Shim Layer to support communication based on use of shadow addresses in source routing.

In the protocol stack 1600, the IP-Shim Layer is carried using a new IP Protocol number, which can be reserved from the Protocol Numbers registry maintained by the International Assigned Number Authority (IANA). For example, the IP-Protocol number for the IP-Shim layer may be 145 or any other suitable number. The IP-Shim Layer is defined as being generic such that it can carry any "enhancement" related to IP layer which, in order to support implementation of SSR in IPv6 networks, would include the SSR. The only router that inspects the IP-Shim Header is the router corresponding to the destination address of the packet or any router if a Router Alert Option is set in the IPV4 Header or IPv6 Header. An example format of an IP-Shim Header for use in the IP-Shim Layer is presented with respect to FIG. 17.

FIG. 17 depicts an example embodiment of an IP-Shim Header for use to support communication based on use of shadow addresses in source routing. The IP-Shim Header 1700 includes a Type field, a Length field, a Next Header field, and a Payload field. The IP-Shim Protocol is defined as generic and may carry different types within it. The Type field is an 8-bit field that carries the type. A new Type may be defined for an IPv4-mapped-IPv6-SSR. For example, the new Type for the IPv4-mapped-IPv6-SSR may be defined as follows: Type 18=IPv4-mapped-IPv6-SSR. It is noted that, herein, "IPv4-mapped-IPv6-SSR Header" means the IP-Shim Header Type 18. It will be appreciated that other values may be used for the Type for the IPv4-mapped-IPv6-SSR. The Length field is a 16-bit field that carries the length of the payload in octets, where the octets of the Type, Length, and Next Header fields are excluded. The Next Header field provides the IP Protocol type of the header next to the IP-Shim Header (e.g., TCP, UDP, ICMP, or the like). The Payload field includes the type-specific format. The payload includes one or more IPv4 addresses for use as shadow addresses for hops of the source route. An example format of a Payload of the IPv4-mapped-IPv6-SSR Shim Header is presented with respect to FIG. 18.

FIG. 18 depicts an example embodiment of an IPv4-mapped-IPv6-SSR Header for use as a payload in the IP-Shim Header to support communication based on use of shadow addresses in source routing. The IPv4-mapped-IPv6-SSR Option 1800, for use as a payload in the IP-Shim Header to support communication based on use of shadow addresses in source routing, includes a Pointer field and an IPv4 Address List. The Pointer field is a 1-octet field that indicates the octet in IPv4 Address[ ] which begins the next offset to process. The pointer is relative to this payload, and the smallest possible value for the Pointer is 1, which points to the 1st octet, i.e., the area immediately after the Pointer field. The IPv4 Address [1 . . . n] List includes a list of one or more IPv4 addresses, which is the ordered list of the hops in the source route, where each hop is encoded by its shadow IPv4 address.

The originator of IPv4-mapped-IPv6-SSR-Shim also inserts IPv6 Router Alert Option so that each router inspects the Shim Header. When a router routes an IPv6 packet that includes IPv6 router alert, then it checks to see if IPv4-mapped-IPv6-SSR-Shim Header is present. If the IPv4-mapped-IPv6-SSR-Shim Header is present then, based on the Pointer, the router evaluates the next IPv4 shadow address. If Pointer is greater than the Length, then SSR is considered to be traversed. If there is a next IPv4 Address in the SSR then the next SSR is processed and the router increments the Pointer by 4.

Various example embodiments may be configured to support implementation of SSR in IPv6 in various other ways.

Figure 19:
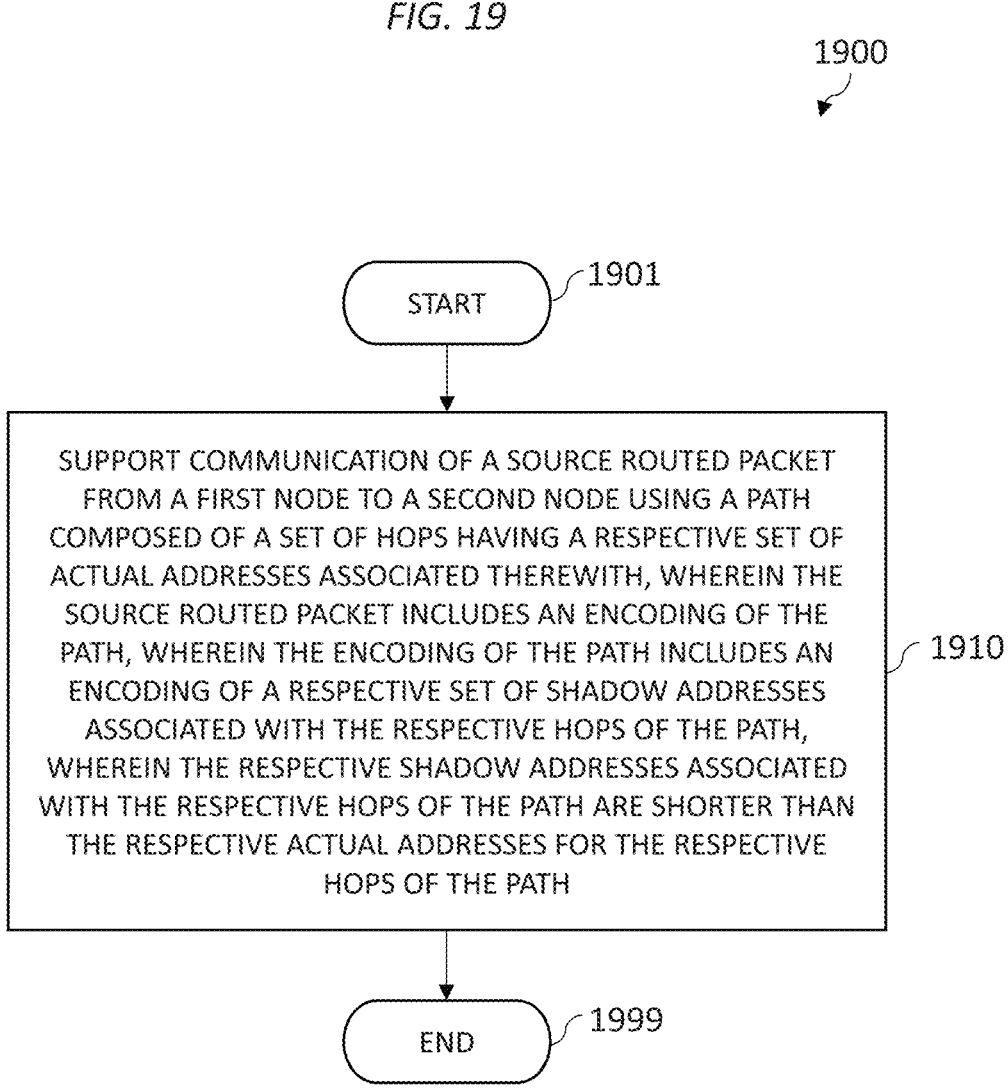
FIG. 19 depicts an example embodiment of a method for supporting communication based on use of shadow addresses in source routing.

FIG. 19 depicts an example embodiment of a method for supporting communication based on use of shadow addresses in source routing. It will be appreciated that, although primarily presented herein as being performed serially, at least a portion of the functions of method 1900 may be performed contemporaneously or in a different order than as presented in FIG. 19. At block 1901, the method 1900 begins. At block 1910, support communication of a source routed packet from a first node to a second node using a path composed of a set of hops having a respective set of actual addresses associated therewith, wherein the source routed packet includes an encoding of the path, wherein the encoding of the path includes an encoding of a respective set of shadow addresses associated with the respective hops of the path, wherein the respective shadow addresses associated with the respective hops of the path are shorter than the respective actual addresses for the respective hops of the path. At block 1999, the method 1900 ends.

It will be appreciated that, although various example embodiments for supporting source route compression based on shadow addresses are primarily presented herein within the context of unicast routing using source routing techniques, various example embodiments for supporting source route compression based on use of shadow addresses also may be applied within the context of multicast routing using source routing techniques. It is noted that, in multicast, source routing is often referred to as stateless multicast where the source route includes the list of all network elements in the stateless multicast tree and each node in the stateless multicast tree inspects each entry in the source route to find directly connected network elements and replicate the source routed packet to the directly connected network elements for distribution of source routed packets across the stateless multicast tree.

It will be appreciated that, although various example embodiments for supporting source route compression based on shadow addresses are primarily presented herein within the context of specific types of packet switching technologies (e.g., primarily within the context of SR-IPv6 where the shadow addresses used to represent IPv6 addresses are IPv4 addresses), various example embodiments for supporting source route compression based on use of shadow addresses also may be applied within the context of various other packet switching technologies (e.g., the underlying packet switching technology of the actual addresses, the packet switching technology which forms the basis for the shorter shadow addresses, or the like, as well as various combinations thereof.

Various example embodiments for supporting source route compression may provide various advantages or potential advantages. For example, various example embodiments for supporting source route compression may be configured to support source route compression based on use of shadow addresses (shorter addresses) in place of actual addresses (longer addresses) for encoding source routes in packets. For example, various example embodiments for supporting source route compression may be configured to support generic source route compression for various packet switching technologies. For example, various example embodiments for supporting source route compression may be configured to support generic source route compression for various packet switching technologies with minimal data plane changes. For example, various example embodiments for supporting source route compression may be configured to support generic and efficient source route compression while imposing optimal overhead in packets for encoding source routes in packets. Various example embodiments for supporting source routing may provide various other advantages or potential advantages. For example, various example embodiments for supporting source route compression may be configured to support header compression in the range of up to 84% to 90.2% for SR-IPv6 (which is significant given that a packet traversing 30 strict hops will account for 480B of overhead on the packet which results in a 32% overhead penalty on a 1500B standard MTU size packet (e.g., an immediate loss of 3.2 gigabits per second on a 10 gigabit per second link) or a 93.2% overhead penalty on a 512B packet (e.g., an immediate loss of 9.32 gigabits per second on a 10 gigabit per second link)). For example, various example embodiments for supporting source route compression may be configured to support header compression in the range of up to 45.3%-70.83% for SR-IPv4. For example, various example embodiments for supporting source route compression may be configured to support header compression in the range of up to 45.3%-70.83% for SR-MPLS. For example, various example embodiments for supporting source route compression may be configured to support header compression of up to 29% for SR with Ethernet. Various example embodiments for supporting source route compression may provide various other advantages or potential advantages.

Figure 20:
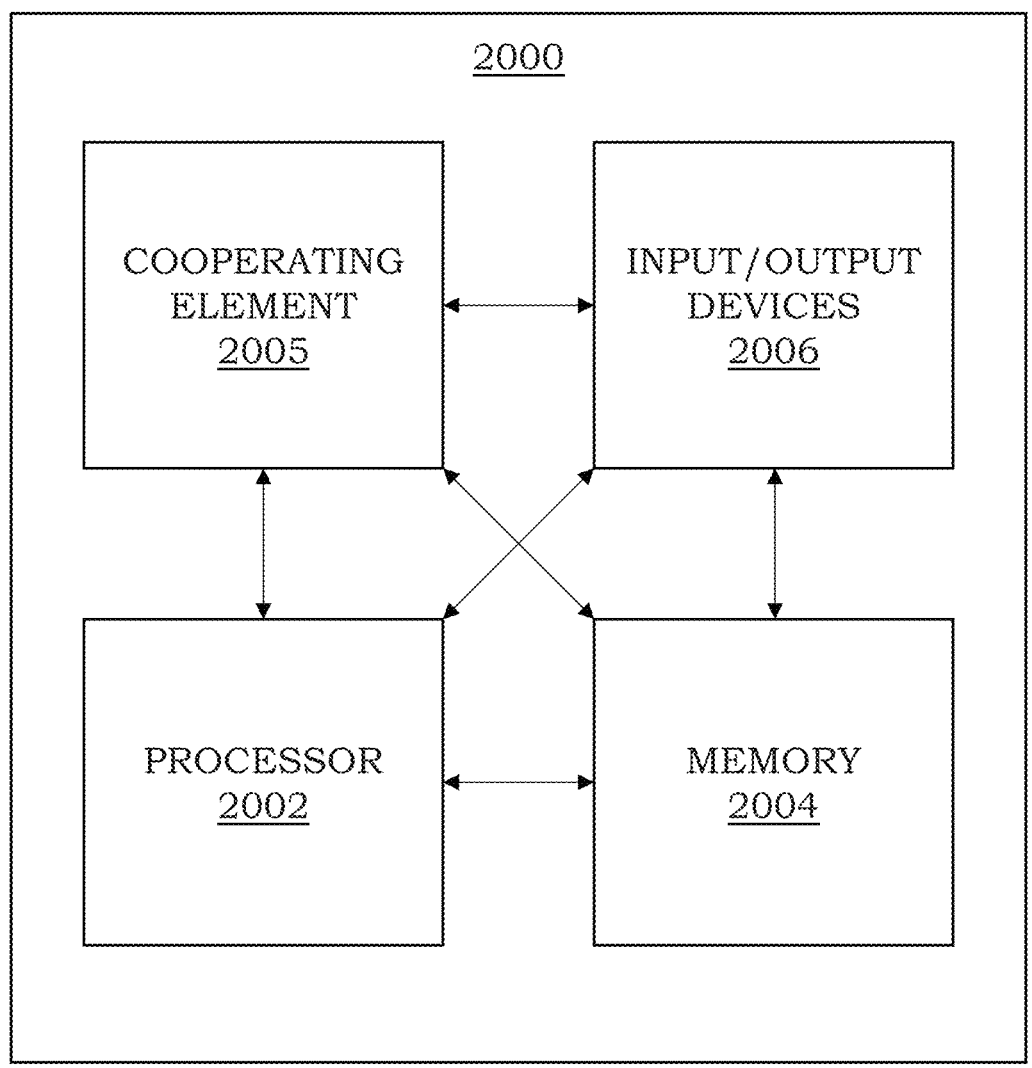
FIG. 20 depicts an example embodiment of a computer suitable for use in performing various functions presented herein.

FIG. 20 depicts an example embodiment of a computer suitable for use in performing various functions presented herein.

The computer 2000 includes a processor 2002 (e.g., a central processing unit (CPU), a processor, a processor having a set of processor cores, a processor core of a processor, or the like) and a memory 2004 (e.g., a random access memory, a read only memory, or the like). The processor 2002 and the memory 2004 may be communicatively connected. In at least some example embodiments, the computer 2000 may include at least one processor and at least one memory including a set of instructions, wherein the set of instructions is configured to, when executed by the at least one processor, cause the computer to perform various functions presented herein.

The computer 2000 also may include a cooperating element 2005. The cooperating element 2005 may be a hardware device. The cooperating element 2005 may be a process that can be loaded into the memory 2004 and executed by the processor 2002 to implement various functions presented herein (in which case, for example, the cooperating element 2005 (including associated data structures) can be stored on a non-transitory computer-readable storage medium, such as a storage device or other suitable type of storage element (e.g., a magnetic drive, an optical drive, or the like)).

The computer 2000 also may include one or more input/output devices 2006. The input/output devices 2006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2000 may represent a general architecture and functionality suitable for implementing functional elements described herein, portions of functional elements described herein, or the like, as well as various combinations thereof. For example, computer 2000 may provide a general architecture and functionality that is suitable for implementing one or more elements presented herein, such as node or a portion thereof, a controller or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including instructions which, when executed by the at least one processor, cause the apparatus at least to:
   receive, by a node, a source routed packet being communicated from a first node to a second node using a path composed of a set of hops having a respective set of actual addresses associated therewith, wherein the source routed packet includes an encoding of the path, wherein the encoding of the path includes an encoding of a respective set of shadow addresses associated with the respective hops of the path, wherein the respective shadow addresses associated with the respective hops of the path are shorter than the respective actual addresses for the respective hops of the path;
   identify, by the node, one of the hops of the path that is adjacent to the node;
   determine, by the node based on the respective shadow address of the one of the hops of the path that is adjacent to the node, the respective actual address of the one of the hops of the path that is adjacent to the node; and
   forward, by the node toward the one of the hops of the path based on the respective actual address of the one of the hops of the path, the source routed packet.

2. The apparatus of claim 1, wherein the set of hops of the path includes at least one of at least one strict hop and at least one loose hop.

3. The apparatus of claim 1, wherein the respective actual addresses for the respective hops of the path include Internet Protocol (IP) addresses, Multiprotocol Label Switching (MPLS) labels, or Media Access Control (MAC) addresses.

4. The apparatus of claim 1, wherein the respective shadow addresses associated with the respective hops of the path are based on hashing of the respective actual addresses for the respective hops of the path.

5. The apparatus of claim 1, wherein the actual addresses for the respective hops of the path include Internet Protocol version 6 (IPv6) addresses and the shadow addresses associated with the respective hops of the path include Internet Protocol version 4 (IPv4) addresses.

6. The apparatus of claim 1, wherein the encoding of the path includes an indication that the path is encoded within the source routed packet using the respective shadow addresses associated with the respective hops of the path rather than the respective actual addresses for the respective hops of the path.

7. The apparatus of claim 1, wherein the encoding of the path is included within an Internet Protocol version 6 (IPv6) Extension Header (EH).

8. The apparatus of claim 7, wherein the encoding of the path is included within a Hop-by-Hop Options Header.

9. The apparatus of claim 8, wherein the Hop-by-Hop Options Header includes a Next Header field, a Header Extension Length field, and an Options field, wherein the Options field includes an Option Type field, an Option Data Length field, and an Option Data field, wherein the Option Data field includes an address list including the respective shadow addresses associated with the respective hops of the path.

10. The apparatus of claim 1, wherein the encoding of the path is included within an Internet Protocol version 6 (IPv6) Shim Header disposed between an IPv6 Header and a transport layer protocol header.

11. The apparatus of claim 10, wherein the IPv6 Shim Header includes a Type field, a Length field, a Next Header field, and a Payload field, wherein the Payload field includes a Pointer field and an Address list field.

12. The apparatus of claim 11, wherein the Address list field includes an address list including the respective shadow addresses associated with the respective hops of the path, wherein the Pointer field includes a value indicative of a next address in the address list to be processed.

13. The apparatus of claim 1, wherein the one of the hops of the path that is adjacent to the node is determined based on an offset value associated with the encoding of the path.

14. The apparatus of claim 1, wherein the respective actual address of the one of the hops of the path that is adjacent to the node is determined based on a set of mappings of the respective shadow addresses associated with the respective hops of the path to the actual addresses of the path.

15. A non-transitory computer readable storage medium storing computer program instructions which, when executed by an apparatus, cause the apparatus at least to:
   receive, by a node, a source routed packet being communicated from a first node to a second node using a path composed of a set of hops having a respective set of actual addresses associated therewith, wherein the source routed packet includes an encoding of the path, wherein the encoding of the path includes an encoding of a respective set of shadow addresses associated with the respective hops of the path, wherein the respective shadow addresses associated with the respective hops of the path are shorter than the respective actual addresses for the respective hops of the path;
   identify, by the node, one of the hops of the path that is adjacent to the node;

determine, by the node based on the respective shadow address of the one of the hops of the path that is adjacent to the node, the respective actual address of the one of the hops of the path that is adjacent to the node; and forward, by the node toward the one of the hops of the path based on the respective actual address of the one of the hops of the path, the source routed packet.

16. A method, comprising:

receiving, by a node, a source routed packet being communicated from a first node to a second node using a path composed of a set of hops having a respective set of actual addresses associated therewith, wherein the source routed packet includes an encoding of the path, wherein the encoding of the path includes an encoding of a respective set of shadow addresses associated with the respective hops of the path, wherein the respective shadow addresses associated with the respective hops of the path are shorter than the respective actual addresses for the respective hops of the path;

identifying, by the node, one of the hops of the path that is adjacent to the node;

determining, by the node based on the respective shadow address of the one of the hops of the path that is adjacent to the node, the respective actual address of the one of the hops of the path that is adjacent to the node; and forwarding, by the node toward the one of the hops of the path based on the respective actual address of the one of the hops of the path, the source routed packet.

\* \* \* \* \*